US010039067B2

United States Patent
Chang et al.

(10) Patent No.: US 10,039,067 B2
(45) Date of Patent: Jul. 31, 2018

(54) PROCESSING METHOD AND DEVICE FOR OBTAINING SYNCHRONIZATION

(71) Applicant: Huawei Technologies Co., Ltd., Shenzhen, Guangdong (CN)

(72) Inventors: Junren Chang, Beijing (CN); Yuhua Chen, Shenzhen (CN); Qufang Huang, Shanghai (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 14/178,026

(22) Filed: Feb. 11, 2014

(65) Prior Publication Data

US 2014/0161070 A1    Jun. 12, 2014

Related U.S. Application Data

(63) Continuation of application No. PCT/CN2012/079747, filed on Aug. 7, 2012.

(30) Foreign Application Priority Data

Aug. 11, 2011  (CN) .......................... 2011 1 0229806

(51) Int. Cl.
    *H04W 4/00*      (2018.01)
    *H04W 56/00*     (2009.01)
    (Continued)

(52) U.S. Cl.
    CPC ............. *H04W 56/001* (2013.01); *H04L 1/00* (2013.01); *H04W 56/0045* (2013.01);
    (Continued)

(58) Field of Classification Search
    CPC ...... H04W 72/04; H04W 88/08; H04W 76/00
    See application file for complete search history.

(56) References Cited

U.S. PATENT DOCUMENTS

2008/0273610 A1  11/2008 Malladi et al.
2009/0186613 A1   7/2009 Ahn et al.
    (Continued)

FOREIGN PATENT DOCUMENTS

CN    101686557 A    3/2010
CN    101883369 A   11/2010
    (Continued)

OTHER PUBLICATIONS

U.S. Appl. No. 61/466,946 Provisional Specification.*
    (Continued)

*Primary Examiner* — Siren Wei
(74) *Attorney, Agent, or Firm* — Leydig, Voit & Mayer, Ltd.

(57) ABSTRACT

The present disclosure provides a processing method and device for obtaining synchronization, where the method includes: selecting, by a UE, a preamble on a first Scell, and reporting information of the preamble to a base station by using a current PCell or a second SCell of the UE; receiving scheduling information of a random access response message or scheduling information of a conflict indication message delivered by the base station from a physical downlink control channel of the PCell, the second SCell or the first SCell by using a C-RNTI of the UE; and receiving the random access response message or the conflict indication message from a physical downlink shared channel according to the scheduling information of the random access response message or the scheduling information of the conflict indication message.

13 Claims, 10 Drawing Sheets

(51) Int. Cl.
*H04W 72/04* (2009.01)
*H04W 74/08* (2009.01)
*H04W 74/00* (2009.01)
*H04W 72/02* (2009.01)
*H04L 1/00* (2006.01)
*H04W 72/12* (2009.01)

(52) U.S. Cl.
CPC ....... *H04W 72/02* (2013.01); *H04W 72/0406* (2013.01); *H04W 74/008* (2013.01); *H04W 74/0833* (2013.01); *H04W 74/0858* (2013.01); *H04W 72/1289* (2013.01); *H04W 74/006* (2013.01)

(56) References Cited

U.S. PATENT DOCUMENTS

| | | | | |
|---|---|---|---|---|
| 2009/0191875 | A1* | 7/2009 | Vujcic | H04W 74/004 455/436 |
| 2010/0195607 | A1* | 8/2010 | Lee | H04W 74/0866 370/329 |
| 2010/0322096 | A1* | 12/2010 | Hsu | H04W 74/002 370/252 |
| 2011/0026409 | A1* | 2/2011 | Hu | H04L 1/1867 370/243 |
| 2011/0182200 | A1 | 7/2011 | Wan et al. | |
| 2011/0274077 | A1* | 11/2011 | Yamada | H04W 72/042 370/329 |
| 2012/0243514 | A1* | 9/2012 | Wu | H04W 56/0045 370/336 |
| 2012/0275390 | A1* | 11/2012 | Korhonen | H04W 74/006 370/329 |
| 2012/0300714 | A1* | 11/2012 | Ng | H04W 56/0045 370/329 |
| 2013/0010711 | A1* | 1/2013 | Larsson | H04W 56/0005 370/329 |
| 2014/0044074 | A1 | 2/2014 | Chen et al. | |

FOREIGN PATENT DOCUMENTS

| | | | | |
|---|---|---|---|---|
| CN | 101911543 A | 12/2010 | | |
| CN | 102118801 A | 7/2011 | | |
| CN | 102123516 A | 7/2011 | | |
| EP | 2077692 A2 | 7/2009 | | |
| EP | 2693801 A1 | 3/2012 | | |
| WO | 2010021960 A1 | 2/2010 | | |
| WO | WO 2010145799 A1 * | 12/2010 | ......... | H04W 72/042 |
| WO | WO 2011037439 A2 | 3/2011 | | |
| WO | 2012130173 A1 | 10/2012 | | |

OTHER PUBLICATIONS

U.S. Appl. No. 61/504,786 Provisional Specification.*
U.S. Appl. No. 61/511,927 Provisional Specification.*
"The Multiple Time Advances in Carrier Aggregation," 3GPP TSG-RAN WG2 Meeting #73bis, Shanghai, China, Document R2-111953, $3^{rd}$ Generation Partnership Project, Valbonne, France (Apr. 11-15, 2011).
"Discussion on Multiple Timing Advance," 3GPP TSG-RAN WG2 Meeting #73bis, Shanghai, China, Document R2-111982, $3^{rd}$ Generation Partnership Project, Valbonne, France (Apr. 11-15, 2011).
"Initiating timing alignment for SCell in multiple TA," TSG-RAN WG2#73, Barcelona, Spain, Document R2-113235, $3^{rd}$ Generation Partnership Project, Valbonne, France (May 9-13, 2011).
"SCell RACH initiation," 3GPP TSG-RAN2 Meeting #74, Barcelona, Spain, Document R2-1113257, $3^{rd}$ Generation Partnership Project, Valbonne, France (May 9-13, 2011).
"RACH issues for supporting multiple TAs," 3GPP TSG-RAN2 Meeting #74, Barcelona, Spain, Document R2-113284, $3^{rd}$ Generation Partnership Project, Valbonne, France (May 9-13, 2011).
"RACH and carrier aggregation," 3GPP TSG-RAN WG2 Meeting #68bis, Vallencia, Spain, R2-100372, $3^{rd}$ Generation Partnership Project, Valbonne, France (Jan. 18-22, 2010).
"Multiple Timing Advance," 3GPP TSG-RAN WG2 Meeting #73bis, Shanghai, China, R2-111897, $3^{rd}$ Generation Partnership Project, Valbonne, France (Apr. 11-15, 2011).
"Further analysis on RAN overload control mechanisms," 3GPP TSG-RAN WG2 Meeting #73bis, Shanghai, China, R2-112197, $3^{rd}$ Generation Partnership Project, Valbonne, France (Apr. 11-15, 2011).
"Considerations for RACH initiation on SCell," 3GPP TSG-RAN WG2 Meeting #74, Barcelona, Spain, R2-113050, $3^{rd}$ Generation Partnership Project, Valbonne, France (May 9-13, 2011).

* cited by examiner

PROCESSING METHOD AND DEVICE FOR OBTAINING SYNCHRONIZATION

CROSS-REFERENCE TO RELATED APPLICATIONS

This application is a continuation of International Patent Application No. PCT/CN2012/079747, filed on Aug. 7, 2012, which claims priority to Chinese Patent Application No. 201110229806.4, filed on Aug. 11, 2011. The aforementioned patent applications are hereby incorporated by reference in their entireties.

TECHNICAL FIELD

The present disclosure relates to communications technologies, and in particular, to a processing method and device for obtaining synchronization.

BACKGROUND

In the prior art, in order to increase a peak rate of a user equipment (User Equipment, abbreviated as UE), a concept of carrier aggregation (Carrier Aggregation, abbreviated as CA) is introduced in a further evolution (LTE-Advanced, abbreviated as LTE-A) of the technology of long term evolution (Long Term Evolution, abbreviated as LTE), when the UE needs to aggregate data transmitted by multiple carriers, an evolved base station (evolved Node B, abbreviated as eNB) may allocate multiple serving cells or component carriers (Component Carrier, abbreviated as CC) for the UE, where each CC may correspond to one serving cell. Specifically, a CC may act as a primary CC (Primary CC, abbreviated as PCC), and a cell where the PCC is located may be called a primary cell (Primary Cell, abbreviated as PCell). Other CCs may act as secondary CCs (Secondary CC, abbreviated as SCC), and cells where the SCCs are located may be called secondary cells (Secondary Cell, abbreviated as SCell). Generally, when the UE applies carrier aggregation, in order not to excessively increase times of UE's blind detection on a physical downlink control channel (Physical Downlink Control Channel, abbreviated as PDCCH), on the PCell, blind detection needs to be performed on PDCCH scheduling information of a common search space (Common Search Space, abbreviated as CSS) and a dedicated search space (Dedicated Search Space, abbreviated as DSS), while on the SCells, blind detection only needs to be performed on the PDCCH scheduling information of the CSS. Regarding messages such as paging messages and broadcasting messages that need to be sent through PDCCH scheduling in the SCells, the UE cannot obtain the messages from the CSSs of its own SCells, but instead, obtains the messages by using a dedicated radio link control (Radio Link Control, abbreviated as RLC) message.

The inventor finds that the prior art at least has the following problem: when the UE performs a contention-based random access channel (Random Access Channel, abbreviated as RACH) on the SCells, if all RACH procedures are implemented on the SCells, the UE needs to monitor the CSSs of the SCells to obtain scheduling information of random access response messages of the SCells, thereby inevitably increasing times of blind detection and a false alarm probability.

SUMMARY

Embodiments of the present disclosure provide a processing method and device for obtaining synchronization, to address the defect in the prior art that, when a UE performs a contention-based RACH on SCells, times of blind detection and a false alarm probability are increased if all RACH procedures are implemented on the SCells.

An embodiment of the present disclosure provides a processing method for obtaining synchronization, including:

selecting, by a UE, a preamble on a first SCell, and reporting information of the preamble to a base station by using a PCell or a second SCell of the UE;

receiving, by the UE, scheduling information of a random access response message or scheduling information of a conflict indication message from a physical downlink control channel of the PCell, the second SCell or the first SCell by using a C-RNTI of the UE, where the random access response message and the conflict indication message are delivered by the base station; and receiving, by the UE from the physical downlink shared channel, the random access response message or the conflict indication message according to the scheduling information of the random access response message or the scheduling information of the conflict indication message.

An embodiment of the present disclosure further provides a processing method for obtaining synchronization, including:

receiving, by a base station, information of a preamble reported by a UE by using a PCell or a second SCell of the UE; where the preamble is a preamble selected by the UE on a first SCell; and performing scrambling, by the base station, for scheduling information of a random access response message or scheduling information of a conflict indication message on the PCell, the second SCell or the first SCell by using a radio network temporary identity corresponding to the UE, and sending the scheduling information to the UE by using the physical downlink control channel of the PCell, the second SCell or the first SCell, to enable the UE to receive the random access response message or the conflict indication message from the physical downlink shared channel according to the scheduling information.

An embodiment of the present disclosure further provides a processing method for obtaining synchronization, including:

receiving, by a UE, configuration information corresponding to a first SCell sent by a base station;

selecting, by the UE, a preamble and a PRACH resource on the first SCell; sending, by the UE, the preamble to the base station by using the PRACH resource;

generating, by the UE, a random access-radio network temporary identity according to information of the PRACH resource and the configuration information; and receiving, by the UE, scheduling information of a random access response message from a physical downlink control channel of a PCell or a second SCell of the UE by using the generated random access-radio network temporary identity, and receiving, from a physical downlink shared channel of the PCell, the second SCell, or the first SCell according to the scheduling information, the random access response message sent by the base station.

An embodiment of the present disclosure further provides a processing method for obtaining synchronization, including:

receiving, by a base station, a preamble which is sent by a UE by using a PRACH resource, where the preamble is a preamble selected by the UE on a first SCell, and the PRACH resource is a PRACH resource selected by the UE on the first SCell;

generating, by the base station, a first random access-radio network temporary identity according to configured configuration information corresponding to the first SCell and information of the PRACH resource selected by the UE; and performing scrambling, by the base station, for scheduling information of a random access response message by using the first random access-radio network temporary identity, and sending the scheduling information to the UE by using a physical downlink control channel of a PCell or a second SCell of the UE.

An embodiment of the present disclosure provides a UE, including:

a selecting module, configured to select a preamble on a first SCell;

a reporting module, configured to report information of the preamble to a base station by using a PCell or a second SCell of the UE;

a scheduling information receiving module, configured to receive scheduling information of a random access response message or scheduling information of a conflict indication message from a physical downlink control channel of the PCell, the second SCell or the first SCell by using a C-RNTI of the UE, where the random access response message and the conflict indication message are delivered by the base station; and a message receiving module, configured to receive the random access response message or the conflict indication message from the physical downlink shared channel according to the scheduling information of the random access response message or the scheduling information of the conflict indication message.

An embodiment of the present disclosure provides a base station, including:

a receiving module, configured to receive information of a preamble reported by a UE by using a PCell or a second SCell of the UE, where the preamble is a preamble selected by the UE on a first SCell; and a processing module, configured to perform scrambling for scheduling information of a random access response message or scheduling information of a conflict indication message on the PCell, the second SCell or the first SCell by using a radio network temporary identity corresponding to the UE, and send the scheduling information to the UE by using a physical downlink control channel of the PCell, the second SCell or the first SCell, to enable the UE to receive the random access response message or the conflict indication message from the physical downlink shared channel according to the scheduling information of the random access response message or the scheduling information of the conflict indication message.

An embodiment of the present disclosure further provides a UE, including:

a receiving module, configured to receive configuration information corresponding to a first SCell sent by a base station;

a selecting module, configured to select a preamble and a PRACH resource on the first SCell;

a preamble sending module, configured to send the preamble to the base station by using the PRACH resource;

a random access-radio network temporary identity generating module, configured to generate a random access-radio network temporary identity according to information of the PRACH resource and the configuration information; and a receiving module, configured to receive scheduling information of a random access response message from a physical downlink control channel of a PCell or a second SCell of the UE by using the generated random access-radio network temporary identity, and receive, from a physical downlink shared channel of the PCell, the second SCell or the first SCell and according to the scheduling information, the random access response message sent by the base station.

An embodiment of the present disclosure further provides a base station, including:

a receiving module, configured to receive a preamble which is sent by a UE by using a PRACH resource, where the preamble is a preamble selected by the UE on a first SCell, and the PRACH resource is a PRACH resource selected by the UE on the first SCell;

a first random access-radio network temporary identity generating module, configured to generate a first random access-radio network temporary identity according to configured configuration information corresponding to the first SCell and information of the PRACH resource selected by the UE; and a processing module, configured to perform scrambling for scheduling information of a random access response message by using the first random access-radio network temporary identity, and send the scheduling information to the UE by using a physical downlink control channel of a PCell or a second SCell of the UE.

In the processing method and device for obtaining synchronization provided by the embodiments of the present disclosure, the UE selects a preamble on the first SCell, reports the information of the preamble to the base station by using the PCell or the second SCell of the UE, receives the scheduling information of the random access response message or the scheduling information of the conflict indication message delivered by the base station from the physical downlink control channel of the PCell, the second SCell or the first SCell by using the C-RNTI of the UE, and then receives the random access response message or the conflict indication message from the physical downlink shared channel according to the scheduling information of the random access response message or the scheduling information of the conflict indication message. In this way, the defect in the prior art is addressed: When the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

BRIEF DESCRIPTION OF DRAWINGS

To illustrate the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure more comprehensible, the following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts fall within the protection scope of the present disclosure.

Figure 1:
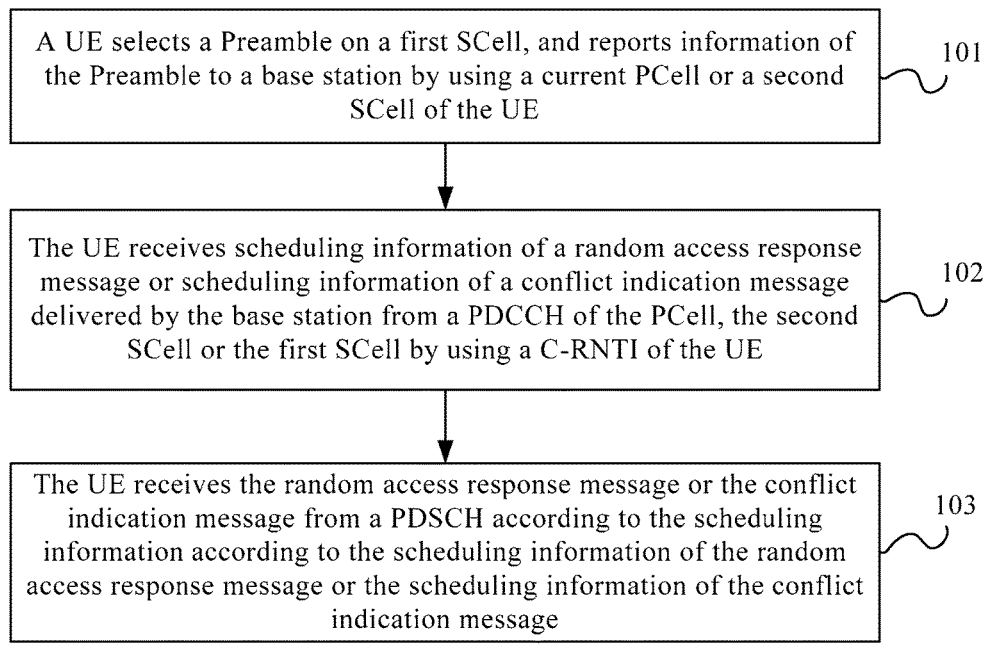
FIG. 1 is a flowchart of a processing method for obtaining synchronization according to an embodiment of the present disclosure.

FIG. 1 is a flowchart of a processing method for obtaining synchronization according to an embodiment of the present disclosure. As shown in FIG. 1, the method according to this embodiment includes:

Step 101: A UE selects a Preamble (preamble) on a first SCell, and reports information of the preamble to a base station by using a current PCell or a second SCell of the UE.

In this embodiment, when the UE is triggered to perform a contention-based RACH (Random Access Channel) on the first SCell, the UE may select the preamble on the first SCell, and report the information of the preamble to the base station by using the current PCell or the second SCell of the UE. Specifically, the information of the preamble includes an identity of the preamble.

Step 102: The UE receives scheduling information of a random access response message or scheduling information of a conflict indication message from a physical downlink control channel (Physical Downlink Control Channel, abbreviated as PDCCH) of the PCell, the second SCell or the first SCell by using a Cell-Radio Network Temporary Identity (C-RNTI) of the UE, where the random access response message and the conflict indication message are delivered by the base station.

In this embodiment, after the UE reports the information of the preamble to the base station by using the current PCell or the second SCell of the UE, the base station may establish a corresponding relationship between the information of the preamble and the UE, when the UE sends the preamble to the base station by using the first SCell, the base station may identify the UE corresponding to the preamble by using the corresponding relationship, and may perform scrambling for the scheduling information of the random access response message on the PCell, the second SCell or the first SCell by using a radio network temporary identity corresponding to the UE, and send the scheduling information to the UE by using the PDCCH of the PCell, the second SCell or the first SCell, and the UE may receive the scheduling information of the random access response message delivered by the base station from the PDCCH of the PCell, the second SCell or the first SCell by using the cell-radio network temporary identity (Cell-Radio Network Temporary Identity, abbreviated as C-RNTI) of the UE.

Alternatively, after the UE reports the information of the preamble to the base station by using the current PCell or the second SCell of the UE, the base station may establish a corresponding relationship between the information of the preamble and the UE, and may also detect whether a conflict occurs between the information of the preamble selected by the UE on the first SCell and information of a preamble selected by another UE, and when a conflict occurs, the base station may perform scrambling for the scheduling information of the conflict indication message on the PCell, the second SCell or the first SCell by using a radio network temporary identity corresponding to the UE, and send the scheduling information to the UE by using the PDCCH of the PCell, the second SCell or the first SCell, and the UE may receive the scheduling information of the conflict indication message delivered by the base station from the PDCCH of the PCell, the second SCell or the first SCell by using the C-RNTI of the UE.

The radio network temporary identity corresponding to the UE used by the base station may include a C-RNTI corresponding to the UE, or a C-RNTI corresponding to the UE and a random access-radio network temporary identity (Random Access-Radio Network Temporary Identity, abbreviated as RA-RNTI) corresponding to the PRACH resource used when the UE sends the preamble.

Step 103: The UE receives the random access response message or the conflict indication message from a physical downlink shared channel (Physical Downlink Shared Channel, abbreviated as PDSCH) according to the scheduling information of the random access response message or the scheduling information of the conflict indication message, where the conflict indication message is used to indicate that a conflict occurs between the information of the preamble selected by the UE and the information of the preamble selected by the another UE.

In this embodiment, the UE selects a preamble on the first SCell, reports the information of the preamble to the base station by using the current PCell or the second SCell of the UE, receives the scheduling information of the random access response message or the scheduling information of the conflict indication message delivered by the base station from the PDCCH of the PCell, the second SCell or the first SCell by using the C-RNTI of the UE, and then receives the random access response message or the conflict indication message from the PDSCH according to the scheduling information of the random access response message or the scheduling information of the conflict indication message. In this way, the defect in the prior art is addressed: when the UE performs a contention-based RACH on SCells, if all RACH procedures are implemented on the SCells, then the UE needs to monitor the CSSs of the SCells to obtain the scheduling information of the random access response messages or the scheduling information of the conflict indication messages of the SCells, thereby inevitably increasing times of blind detection and a false alarm probability.

Figure 2:
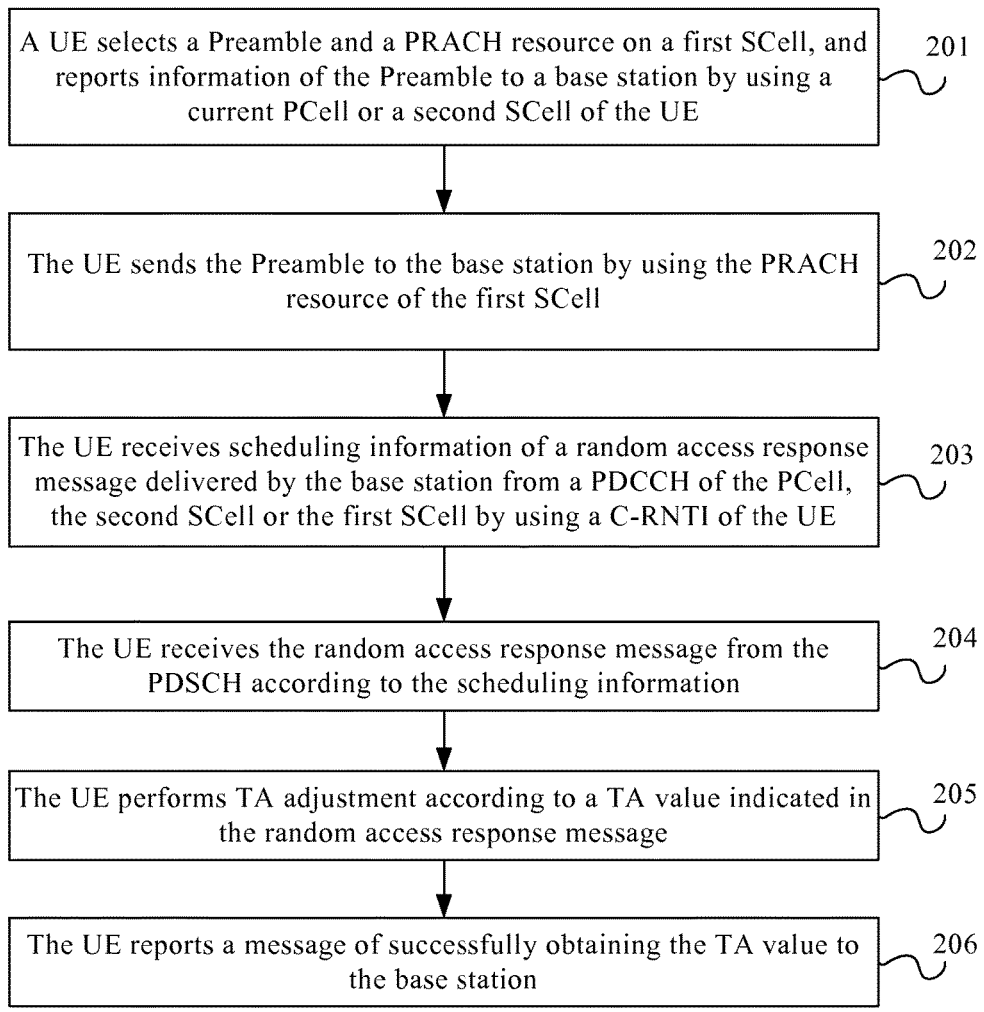
FIG. 2 is a flowchart of a processing method for obtaining synchronization according to another embodiment of the present disclosure.

FIG. 2 is a flowchart of a processing method for obtaining synchronization according to another embodiment of the present disclosure. As shown in FIG. 2, the method according to this embodiment includes:

Step 201: A UE selects a preamble and a physical random access channel (Physical Random Access Channel, abbreviated as PRACH) resource on a first SCell, and reports information of the preamble to a base station by using a current PCell or a second SCell of the UE.

Specifically, the information of the PRACH resource includes a number of the PRACH resource, where the number of the PRACH resource includes a time domain number of the PRACH resource and a frequency domain number of the PRACH resource.

Step 202: The UE sends the preamble to the base station by using the PRACH resource of the first SCell.

Step 203: The UE receives scheduling information of a random access response message delivered by the base station from a PDCCH of the PCell, the second SCell or the first SCell by using a C-RNTI of the UE.

In this embodiment, after the UE reports the information of the preamble to the base station by using the current PCell or the second SCell of the UE, the base station may establish a corresponding relationship between the information of the preamble and the UE, when the UE sends the preamble to the base station by using the PRACH resource of the first SCell, the base station may identify the UE corresponding to the preamble by using the corresponding relationship, and may perform scrambling for the scheduling information of the random access response message on the PCell, the second SCell or the first SCell by using a radio network temporary identity corresponding to the UE, and send the scheduling information to the UE by using the PDCCH of the PCell, the second SCell or the first SCell, and the UE may receive the scheduling information of the random access response message delivered by the base station from the PDCCH of the PCell, the second SCell or the first SCell by using the C-RNTI of the UE.

In addition, the radio network temporary identity corresponding to the UE used by the base station may include a C-RNTI corresponding to the UE, or a C-RNTI corresponding to the UE and an RA-RNTI corresponding to the PRACH resource used when the UE sends the preamble.

Step 204: The UE receives the random access response message from a PDSCH according to the scheduling information.

Step 205: The UE performs TA adjustment according to a timing advance (Timing Advance, abbreviated as TA) value indicated in the random access response message.

Step 206: The UE reports a message of successfully obtaining the TA value to the base station.

In this embodiment, the UE selects a preamble and a PRACH resource on the first SCell, reports the information of the preamble to the base station by using the current PCell or the second SCell of the UE, sends the preamble to the base station by using the PRACH resource of the first SCell, receives the scheduling information of the random access response message delivered by the base station from the PDCCH of the PCell, the second SCell or the first SCell by using the C-RNTI of the UE, receives the random access response message from the PDSCH according to the scheduling information of the random access response message, performs TA adjustment according to the TA value indicated in the random access response message, and finally reports the message of successfully obtaining the TA value to the base station. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Figure 3:
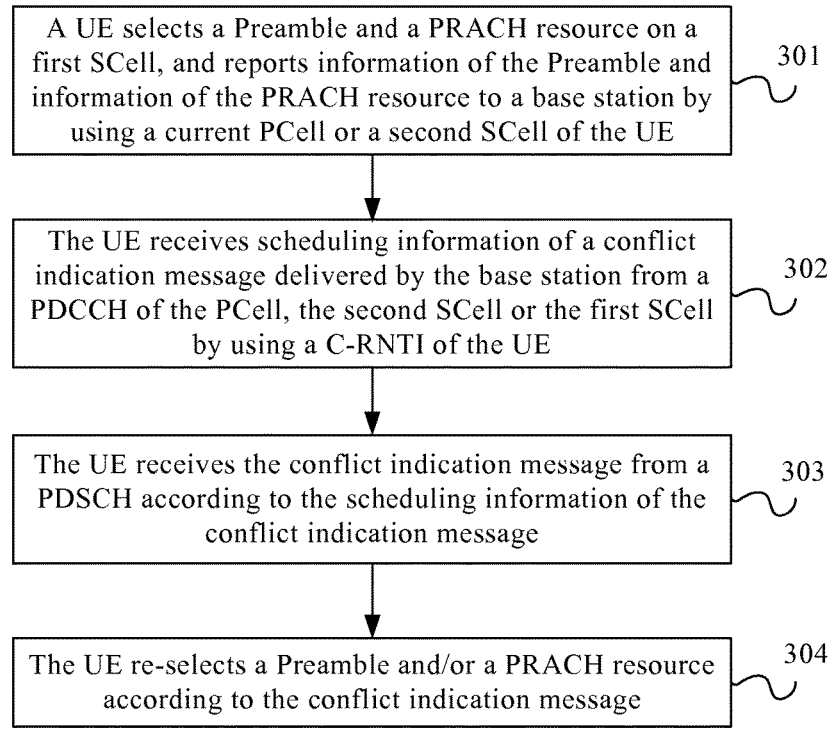
FIG. 3 is a flowchart of a processing method for obtaining synchronization according to yet another embodiment of the present disclosure.

FIG. 3 is a flowchart of a processing method for obtaining synchronization according to yet another embodiment of the present disclosure. As shown in FIG. 3, the method according to this embodiment includes:

Step 301: A UE selects a preamble and a PRACH resource on a first SCell, and reports information of the preamble and information of the PRACH resource to a base station by using a current PCell or a second SCell of the UE.

Specifically, the information of the PRACH resource includes a number of the PRACH resource, where the number of the PRACH resource includes a time domain number of the PRACH resource and a frequency domain number of the PRACH resource.

Step 302: The UE receives scheduling information of a conflict indication message delivered by the base station from a PDCCH of the PCell, the second SCell or the first SCell by using a C-RNTI of the UE.

In this embodiment, after the UE reports the information of the preamble and the information of the PRACH resource to the base station by using the current PCell or the second SCell of the UE, the base station may establish a corresponding relationship between the information of the preamble and the UE, and may also detect whether conflicts occur between the information of the preamble selected by the UE on the first SCell and information of a preamble selected by another UE, and between the information of the PRACH resource selected by the UE on the first SCell and information of a PRACH resource selected by the another UE, and when conflicts occur, the base station may perform scrambling for the scheduling information of the conflict indication message on the PCell, the second SCell or the first SCell by using a radio network temporary identity corresponding to the UE, and send the scheduling information to the UE by using the PDCCH of the PCell, the second SCell or the first SCell, and the UE may receive the scheduling information of the conflict indication message delivered by the base station from the PDCCH of the PCell, the second SCell or the first SCell by using the C-RNTI of the UE.

In addition, the radio network temporary identity corresponding to the UE used by the base station may include a C-RNTI corresponding to the UE, or a C-RNTI corresponding to the UE and an RA-RNTI corresponding to the PRACH resource used when the UE sends the preamble.

When a conflict only occurs between the information of the preambles whereas no conflict occurs between the information of the PRACH resources, or when a conflict only occurs between the information of the PRACH resources whereas no conflict occurs between the information of the preambles, the base station may determine that no conflict occurs at the UE; and after receiving the preamble which is sent by the UE by using the PRACH resource of the first SCell, the base station may identify the UE corresponding to the preamble by using the corresponding relationship, perform scrambling for the scheduling information of the random access response message on the PCell, the second SCell or the first SCell by using the radio network temporary identity corresponding to the UE, and send the scheduling information to the UE by using the corresponding PDCCH. The UE may receive the scheduling information of the random access response message delivered by the base station from the PDCCH of the PCell or the second SCell by using the C-RNTI of the UE.

Step 303: The UE receives the conflict indication message from a PDSCH according to the scheduling information of the conflict indication message. The conflict indication message is used to indicate that conflicts occur between the information of the preamble selected by the UE and the information of the preamble selected by another UE, and between the information of the PRACH resource selected by the UE and the information of the PRACH resource selected by the another UE.

Step 304: The UE re-selects a preamble and/or a PRACH resource according to the conflict indication message.

In this embodiment, after the UE reports information of the re-selected preamble, or the information of the re-selected preamble and information of the re-selected PRACH resource to the base station, the base station may establish a corresponding relationship between the preamble and the UE. If the base station detects that no conflict occurs between the information of the preamble selected by the UE and the information of the preamble selected by the another UE, or the base station detects that no conflict occurs between the information of the preamble selected by the UE and the information of the preamble selected by the another UE, or between the information of the PRACH resource selected by the UE and the information of the PRACH resource selected by the another UE, after receiving the re-selected preamble which is sent by the UE by using the PRACH resource of the first SCell, the base station may identify a UE corresponding to the re-selected preamble by using the corresponding relationship, perform scrambling for the scheduling information of the random access response message on the PCell, the second SCell or the first SCell by using the radio network temporary identity corresponding to the UE, and send the scheduling information to the UE by using the PDCCH of the PCell, the second SCell or the first SCell. The UE may receive the scheduling information of the random access response message delivered by the base station from the PDCCH of the PCell, the second SCell or the first SCell by using the C-RNTI of the UE, finally receive the random access response message from the PDSCH by using the scheduling information, and may also perform TA adjustment according to a TA value indicated in the random access response message, and then report a message of successfully obtaining the TA value to the base station.

In this embodiment, the UE selects a preamble and a PRACH resource on the first SCell, reports the information of the preamble and the information of the PRACH resource to the base station by using the current PCell or the second SCell of the UE; receives the scheduling information of the conflict indication message delivered by the base station from the PDCCH of the PCell, the second SCell or the first SCell by using the C-RNTI of the UE, then receives the conflict indication message from the PDSCH according to the scheduling information, and re-selects a preamble and/or a PRACH resource according to the conflict indication message. In this way, the defect in the prior art is addressed: when the UE performs a contention-based RACH on SCells, if all RACH procedures are implemented on the SCells, the UE needs to monitor the CSSs of the SCells to obtain the scheduling information of the conflict indication messages of the SCells, thereby inevitably increasing times of blind detection and a false alarm probability.

Further, in yet another embodiment of the present disclosure, based on the embodiments shown in FIG. 1, FIG. 2, or FIG. 3, before step 101, step 201 or step 301, the following step may be further included:

receiving, by the UE, a preamble subset which is allowed to be used by the first SCell and notified by the base station, where the preamble subset is a part of preambles divided from a preamble set of the first SCell by the base station.

Accordingly, the selecting, by a UE, a preamble on a first SCell in step 101, step 201 or step 301 may be:

selecting, by the UE, a preamble from the preamble subset on the first SCell.

Further, in yet another embodiment of the present disclosure, based on the embodiments shown in FIG. 1, FIG. 2, or FIG. 3, before step 101, step 201 or step 301, the following step may be further included:

receiving, by the UE, a PRACH resource subset which is allowed to be used by the UE on the first SCell and notified by the base station, where the PRACH resource subset is a part of PRACH resources divided from a PRACH resource set of the first SCell by the base station.

Accordingly, the selecting, by a UE, a PRACH resource on a first SCell in step 101, step 201 or step 301 may be:

selecting, by the UE, a PRACH resource from the PRACH resource subset.

Further, in another embodiment of the present disclosure, based on the embodiments shown in FIG. 1, FIG. 2, or FIG. 3, before step 101, step 201 or step 301, the following steps may be further included:

receiving, by the UE, a preamble subset which is allowed to be used by the first SCell and notified by the base station, where the preamble subset is a part of preambles divided from a preamble set of the first SCell by the base station; and receiving, by the UE, a PRACH resource subset which is allowed to be used by the UE on the first SCell and notified by the base station, where the PRACH resource subset is a part of PRACH resources divided from a PRACH resource set of the first SCell by the base station.

Accordingly, the selecting, by a UE, a preamble and a PRACH resource on a first SCell in step 101, step 201 or step 301 may be:

selecting, by the UE, a preamble from the preamble subset on the first SCell, and selecting a PRACH resource from the PRACH resource subset.

Figure 4:
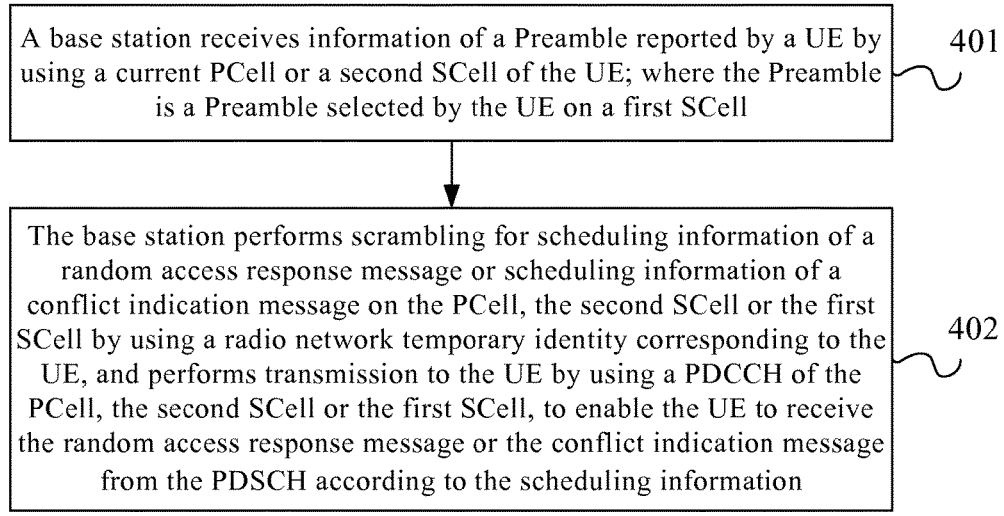
FIG. 4 is a flowchart of a processing method for obtaining synchronization according to yet another embodiment of the present disclosure.

FIG. 4 is a flowchart of a processing method for obtaining synchronization according to yet another embodiment of the present disclosure. As shown in FIG. 4, the method according to this embodiment includes:

Step 401: A base station receives information of a preamble reported by a UE by using a current PCell or a second SCell of the UE, where the preamble is a preamble selected by the UE on a first SCell.

In this embodiment, the UE may implement the technical solution of the method embodiment shown in FIG. 1, implementation principles thereof are similar to those described above, and details will not be described herein again.

Step 402: The base station performs scrambling for scheduling information of a random access response message or scheduling information of a conflict indication message on the PCell, the second SCell or the first SCell by using a radio network temporary identity corresponding to the UE, and sends it to the UE by using a PDCCH of the PCell, the second SCell or the first SCell, to enable the UE to receive the random access response message or the conflict indication message from a PDSCH according to the scheduling information.

In this embodiment, after the UE reports the information of the preamble to the base station by using the current PCell, the second SCell or the first SCell of the UE, the base station may establish a corresponding relationship between the information of the preamble and the UE; when the UE sends the preamble to the base station by using the first SCell, the base station may identify the UE corresponding to the preamble by using the corresponding relationship, perform scrambling for scheduling information of the random access response message on the PCell, the second SCell or the first SCell by using the radio network temporary identity corresponding to the UE, and send the scheduling information to the UE by using the PDCCH of the PCell, the second SCell or the first SCell. The UE may receive the scheduling information of the random access response message delivered by the base station from the PDCCH of the PCell, the second SCell or the first SCell by using the C-RNTI of the UE, and then the UE receives the random access response message from the PDSCH according to the scheduling information of the random access response message.

Alternatively, after the UE reports the information of the preamble to the base station by using the current PCell or the second SCell of the UE, the base station may establish a corresponding relationship between the information of the preamble and the UE, and may also detect whether a conflict occurs between the information of the preamble selected by the UE on the first SCell and information of a preamble selected by another UE. When a conflict occurs, the base station may perform scrambling for the scheduling information of the conflict indication message on the PCell, the second SCell or the first SCell by using the radio network temporary identity corresponding to the UE, and send the scheduling information to the UE by using the PDCCH of the PCell, the second SCell or the first SCell. The UE may receive the scheduling information of the conflict indication message delivered by the base station from the PDCCH of the PCell, the second SCell or the first SCell by using the C-RNTI of the UE, and then the UE receives the conflict indication message from the PDSCH according to the scheduling information.

The radio network temporary identity corresponding to the UE used by the base station may include a C-RNTI corresponding to the UE, or a C-RNTI corresponding to the UE and an RA-RNTI corresponding to the PRACH resource used when the UE sends the preamble.

In this embodiment, the base station receives the information of the preamble reported by the UE by using the current PCell or the second SCell of the UE, performs scrambling for the scheduling information of the random access response message or the scheduling information of the conflict indication message on the PCell, the second SCell or the first SCell by using the radio network temporary identity corresponding to the UE, and sends it to the UE by using the PDCCH of the PCell, the second SCell or the first SCell, to enable the UE to receive the random access response message or the conflict indication message from the PDSCH according to the scheduling information of the random access response message or the scheduling information of the conflict indication message. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages or the scheduling information of the conflict indication messages of the SCells, thereby inevitably increasing times of blind detection and a false alarm probability.

Figure 5:
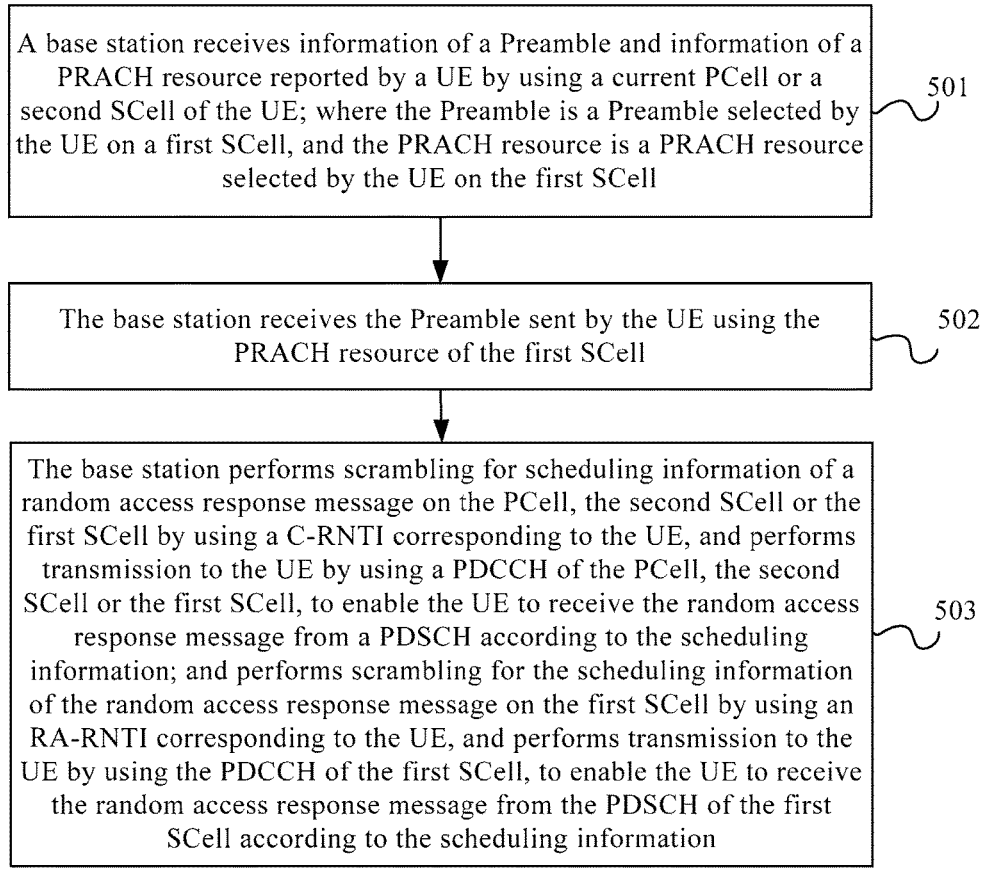
FIG. 5 is a flowchart of a processing method for obtaining synchronization according to yet another embodiment of the present disclosure.

FIG. 5 is a flowchart of a processing method for obtaining synchronization according to yet another embodiment of the present disclosure. As shown in FIG. 5, the method according to this embodiment includes:

Step 501: A base station receives information of a preamble and information of a PRACH resource, which are reported by a UE by using a current PCell or a second SCell of the UE, where the preamble is a preamble selected by the UE on a first SCell, and the PRACH resource is a PRACH resource selected by the UE on the first SCell.

Step 502: The base station receives the preamble which is sent by the UE by using the PRACH resource of the first SCell.

Step 503: The base station performs scrambling for scheduling information of a random access response message on the PCell, the second SCell or the first SCell by using a C-RNTI corresponding to the UE, and sends it to the UE by using a PDCCH of the PCell, the second SCell or the first SCell, to enable the UE to receive the random access response message from the PDSCH according to the scheduling information; and performs scrambling for the scheduling information of the random access response message on the first SCell by using an RA-RNTI corresponding to the UE, and sends it to the UE by using the PDCCH of the first SCell, to enable the UE to receive the random access response message from the PDSCH of the first SCell according to the scheduling information.

In this embodiment, the first SCell is a secondary cell of the UE of this embodiment, but the first SCell may also be a primary cell of another UE, when both the UEs send the same preamble to the base station, the base station may perform scrambling for the scheduling information of the random access response message on the PCell, the second SCell or the first SCell by using the C-RNTI of the UE of this embodiment, send the scheduling information to the UE by using the PDCCH of the PCell, the second SCell or the first SCell, perform scrambling for the scheduling information of the random access response message on the first SCell by using the RA-RNTI corresponding to the PRACH resource used when the UE sends the preamble, and send it to the another UE by using the PDCCH of the first SCell, to enable the another UE to receive the random access response message from the PDSCH of the first SCell according to the scheduling information, so as to ensure equality between the UE taking the SCell as an SCell and the UE taking the SCell as a PCell of the another UE during the random access process.

In this embodiment, the base station receives the information of the preamble and the information of the PRACH resource reported by the UE by using the current PCell or the second SCell of the UE, receives the preamble which is selected by the UE on the first SCell and is sent by the UE by using the PRACH resource of the first SCell, performs scrambling for the scheduling information of the random access response message on the PCell, the second SCell or the first SCell by using the C-RNTI corresponding to the UE, and sends it to the UE by using the PDCCH of the PCell, the second SCell or the first SCell, to enable the UE to receive the random access response message from the PDSCH according to the scheduling information. The base station may also perform scrambling for the scheduling information of the random access response message on the first SCell by using the RA-RNTI corresponding to the PRACH resource used when the UE sends the preamble, and send it by using the PDCCH of the first SCell to the another UE which may take the SCell as a PCell, to enable the another UE to receive the random access response message from the PDSCH of the first SCell according to the scheduling information. In this way, the defect in the prior art is addressed: when the UE performs an RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability. Meanwhile, equality is ensured between the UE taking the SCell as an SCell and the another UE taking the SCell as a PCell during the random access process.

Figure 6:
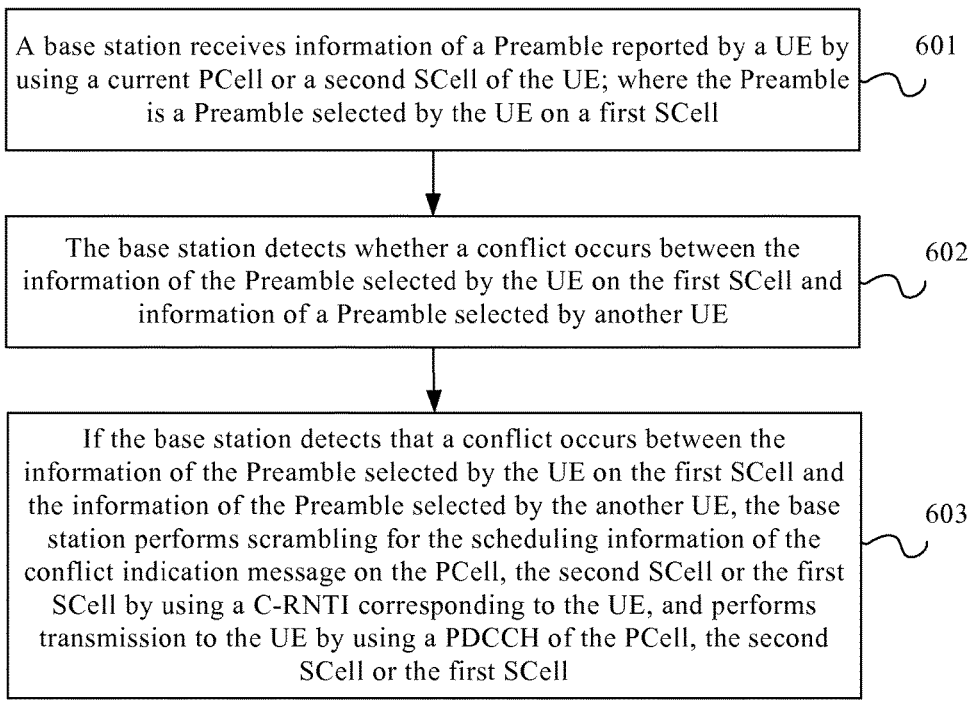
FIG. 6 is a flowchart of a processing method for obtaining synchronization according to yet another embodiment of the present disclosure.

FIG. 6 is a flowchart of a processing method for obtaining synchronization according to yet another embodiment of the present disclosure. As shown in FIG. 6, the method according to this embodiment includes:

Step 601: A base station receives information of a preamble reported by a UE by using a current PCell or a second SCell of the UE; where the preamble is a preamble selected by the UE on a first SCell.

Step 602: The base station detects whether a conflict occurs between the information of the preamble selected by the UE on the first SCell and information of a preamble selected by another UE.

Step 603: If the base station detects that a conflict occurs between the information of the preamble selected by the UE on the first SCell and the information of the preamble selected by the another UE, the base station performs scrambling for scheduling information of a conflict indication message on the PCell, the second SCell or the first SCell by using a C-RNTI corresponding to the UE, and sends it to the UE by using a PDCCH of the PCell, the second SCell or the first SCell.

In this embodiment, the UE may receive the scheduling information of the conflict indication message delivered by the base station from the PDCCH of the PCell, the second SCell or the first SCell by using the C-RNTI of the UE, receive the conflict indication message from a PDSCH according to the scheduling information, and then re-select a preamble and/or a PRACH resource according to the conflict indication message.

In this embodiment, the base station receives the information of the preamble reported by the UE by using the current PCell or the second SCell of the UE, and if it is detected that a conflict occurs at the information of the preamble selected by the UE on the first SCell, performs scrambling for the scheduling information of the conflict indication message on the PCell, the second SCell or the first SCell by using the C-RNTI corresponding to the UE, and sends it to the UE by using the PDCCH of the PCell, the second SCell or the first SCell, to enable the UE to receive the conflict indication message from the PDSCH according to the scheduling information. In this way, the defect in the prior art is addressed: when the UE performs a contention-based RACH on SCells, if all RACH procedures are implemented on the SCells, the UE needs to monitor the CSSs of the SCells to obtain the scheduling information of the conflict indication messages of the SCells, thereby inevitably increasing times of blind detection and a false alarm probability.

Further, in yet another embodiment of the present disclosure, based on the embodiment shown in FIG. 6, when the base station further receives information of the PRACH resource reported by the UE by using the current PCell or the second SCell of the UE in step 601; where the PRACH resource is a PRACH resource selected by the UE on the first SCell.

Accordingly, step 602 may be: detecting, by the base station, whether conflicts occur between the information of the preamble selected by the UE on the first SCell and the information of the preamble selected by the another user equipment, and between the information of the PRACH resource selected by the UE on the first SCell and information of a PRACH resource selected by the another user equipment.

Further, the method according to this embodiment further includes:

dividing, by the base station, a part of preambles from a preamble set of the first SCell as a preamble subset, and notifying the UE of the preamble subset, to enable the UE to select a preamble from the preamble subset on the first SCell.

In this embodiment, the first SCell is a secondary cell of the UE of this embodiment, but the first SCell may also be a primary cell of the another UE, the base station may divide a part of preambles from the preamble set of the first SCell as the preamble subset when the first SCell is the secondary cell of the UE of this embodiment, and notify the UE of the preamble subset, so as to enable the UE to select a preamble from the preamble subset on the first SCell.

Furthermore, the method according to this embodiment further includes:

dividing, by the base station a part of PRACH resources from a PRACH resource set of the first SCell as a PRACH resource subset allowed to be used by the UE, and notifying the UE of the PRACH resource subset, to enable the UE to select a PRACH resource from the PRACH resource subset on the first SCell.

In this embodiment, the first SCell is a secondary cell of the UE of this embodiment, but the first SCell may also be a primary cell of the another UE, the base station may divide a part of PRACH resources from the PRACH resource set of the first SCell as the PRACH resource subset when the first SCell is the secondary cell of the UE of this embodiment, and notify the UE of the PRACH resource subset, so as to enable the UE to select a PRACH resource from PRACH resource subset on the first SCell.

Figure 7:
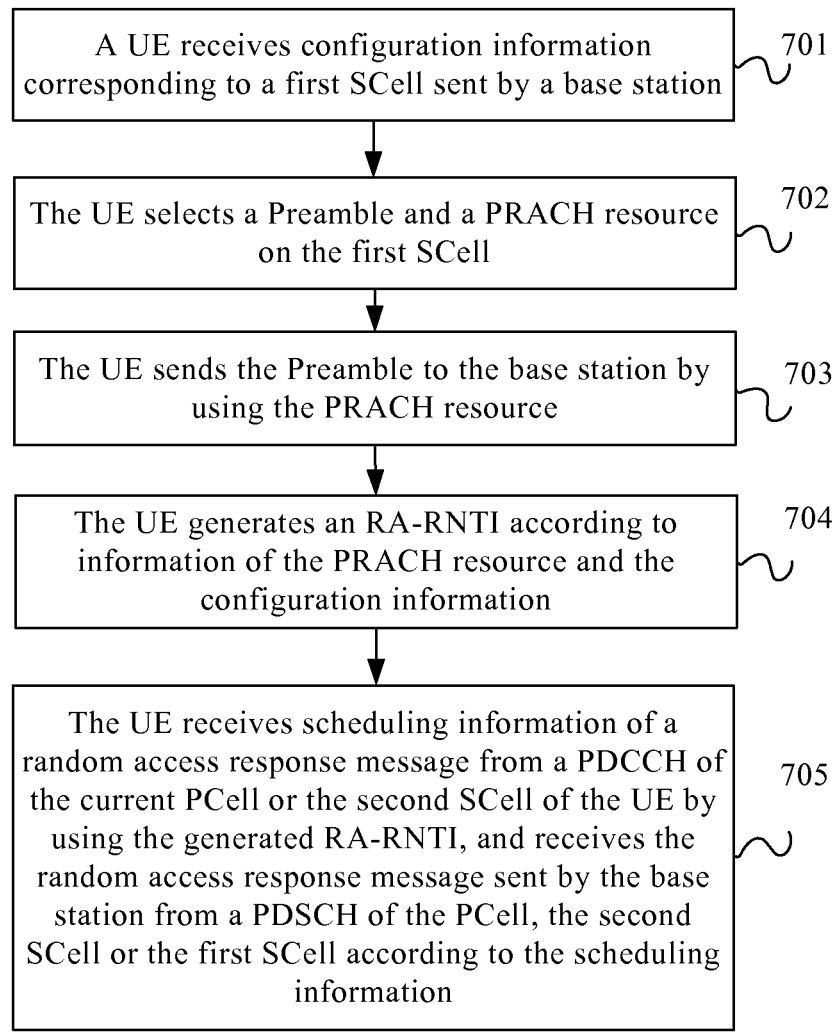
FIG. 7 is a flowchart of a processing method for obtaining synchronization according to another embodiment of the present disclosure.

FIG. 7 is a flowchart of a processing method for obtaining synchronization according to another embodiment of the present disclosure. As shown in FIG. 7, the method according to this embodiment includes:

Step 701: A UE receives configuration information corresponding to a first SCell sent by a base station.

Step 702: The UE selects a preamble and a PRACH resource on the first SCell.

Step 703: The UE sends the preamble to the base station by using the PRACH resource.

Step 704: The UE generates an RA-RNTI according to information of the PRACH resource and the configuration information.

In this embodiment, the configuration information may be an identity value of a timing advance (Timing Advance, abbreviated as TA) group to which the first SCell belongs; or a specific offset value corresponding to the TA group to which the first SCell belongs; or a specific identity value of a network corresponding to the first SCell; or a specific offset value corresponding to the first SCell.

Step 705: The UE receives scheduling information of a random access response message from a PDCCH of the current PCell or the second SCell of the UE by using the generated RA-RNTI, and receives, from a PDSCH of the PCell, the second SCell or the first SCell according to the scheduling information, the random access response message sent by the base station.

In this embodiment, the UE receives the configuration information corresponding to the first SCell sent by the base station, selects a preamble and a PRACH resource on the first SCell, sends the preamble to the base station by using the PRACH resource, generates the RA-RNTI according to the information of the PRACH resource and the configuration information, and finally the UE receives the scheduling information of the random access response message from the PDCCH of the current PCell or the second SCell of the UE by using the generated RA-RNTI, and receives, from the PDSCH of the PCell, the second SCell or the first SCell according to the scheduling information, the random access response message sent by the base station. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Further, in yet another embodiment of the present disclosure, based on the embodiment shown in the method in FIG. 7, step 704 may have the following four specific implementation manners:

First: When the configuration information is a specific offset value Offset_TA-group corresponding to the TA group to which the first SCell belongs, the UE generates the RA-RNTI by using a formula RA-RNTI=1+t_id+10*f_id+Offset_TA-group, according to the information of the PRACH resource and the received specific offset value Offset_TA-group corresponding to the TA group to which the first SCell belongs which is sent by the base station and corresponding to the first SCell.

Second: When the configuration information is an identity value TA-group-index of the TA group to which the first SCell belongs, the UE generates the RA-RNTI by using a formula RA-RNTI=1+t_id+10*f_id+N*TA-group-index, according to the information of the PRACH resource and the received identity value TA-group-index of the TA group to which the first SCell belongs which is sent by the base station and corresponding to the first SCell.

Third: When the configuration information is a specific offset value Offset_SCell corresponding to the first SCell, the UE generates the RA-RNTI by using a formula RA-RNTI=1+t_id+10*f_id+Offset_SCell, according to the information of the PRACH resource and the received specific offset value Offset Scell corresponding to the first SCell, which is sent by the base station and corresponding to the first SCell.

Fourth: When the configuration information is a specific identity value SCell-index of a network corresponding to the first SCell, the UE generates the RA-RNTI by using a formula RA-RNTI=1+t_id+10*f_id+N*SCell-index, according to the information of the PRACH resource and the received specific identity value SCell-index of the network corresponding to the first SCell, which is sent by the base station and corresponding to the first SCell;

where t_id denotes a time domain number of the PRACH resource selected by the UE;

f_id denotes a frequency domain number of the PRACH resource selected by the UE; and 0≤TA-group-index<n, 0≤SCell-index<m, where n, m, and N are integers.

Figure 8:
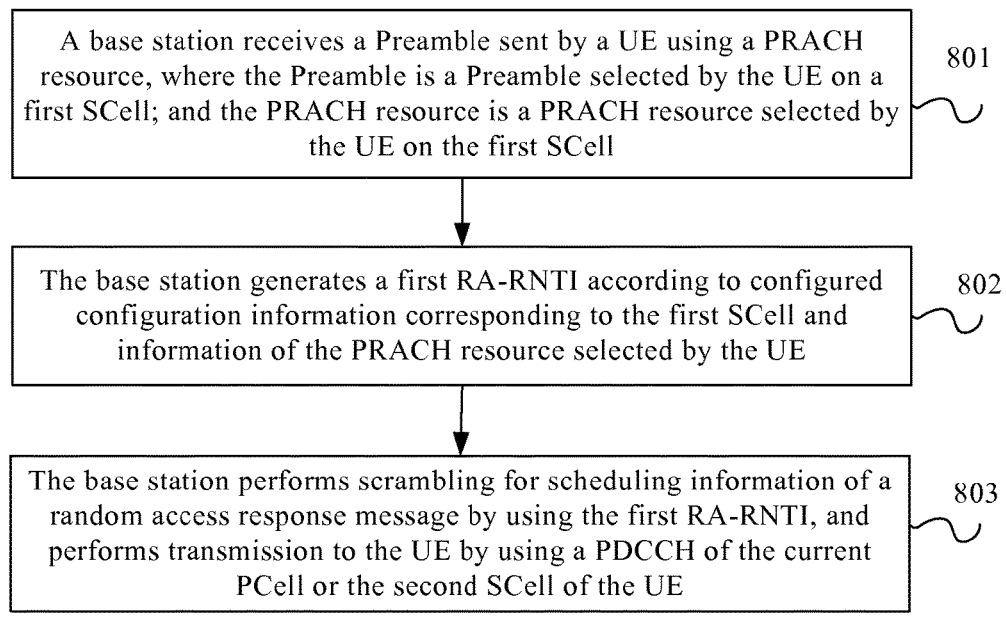
FIG. 8 is a flowchart of a processing method for obtaining synchronization according to yet another embodiment of the present disclosure.

FIG. 8 is a flowchart of a processing method for obtaining synchronization according to yet another embodiment of the present disclosure. As shown in FIG. 8, the method according to this embodiment includes:

Step 801: A base station receives a preamble which is sent by a UE by using a PRACH resource, where the preamble is a preamble selected by the UE on a first SCell; and the PRACH resource is a PRACH resource selected by the UE on the first SCell.

In this embodiment, the UE may perform the technical solution of the method embodiment shown in FIG. 7, implementation principles thereof are similar, and details will not be described herein again.

Step 802: The base station generates a first RA-RNTI according to configured configuration information corresponding to the first SCell and information of the PRACH resource selected by the UE.

Step 803: The base station performs scrambling for scheduling information of a random access response message by using the first RA-RNTI, and sends it to the UE by using a PDCCH of a current PCell or a second SCell of the UE.

In this embodiment, the UE may perform the technical solution of the method embodiment shown in FIG. 7, principles thereof are similar, and details will not be described herein again. In addition, the first RA-RNTI generated by the base station according to the configured configuration information corresponding to the first SCell and the information of the PRACH resource selected by the UE is the same as the RA-RNTI generated by the UE according to the PRACH resource selected by the UE and the received configuration information corresponding to the first SCell which is sent by the base station.

In this embodiment, the base station receives the preamble sent by the UE, where the preamble is a preamble selected by the UE on the first SCell, generates the first RA-RNTI according to the configured configuration information corresponding to the first SCell and information of the PRACH resource selected by the UE, performs scrambling for the scheduling information of the random access response message by using the first RA-RNTI, and sends it to the UE by using the PDCCH of the current PCell or the second SCell of the UE. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Further, in yet another embodiment of the present disclosure, based on the embodiment shown in FIG. 8, before step 801, the following step may be further included:

configuring, by the base station, configuration information corresponding to the first SCell, and sending the configuration information to the UE.

Specifically, the configuration information includes: an identity value of a TA group to which the first SCell belongs; or a specific offset value corresponding to the TA group to which the first SCell belongs; or a specific identity value of a network corresponding to the first SCell; or a specific offset value corresponding to the first SCell.

Accordingly, step 802 may have the following four implementation manners:

First: When the configuration information is a specific offset value Offset_TA-group corresponding to the TA group to which the first SCell belongs, the base station generate the first RA-RNTI by using a formula RA-RNTI=1+t_id+10*f_id+Offset_TA-group, according to the configured specific offset value Offset_TA-group corresponding to the TA group to which the first SCell belongs which is corresponding to the first Scell, and the information of the PRACH resource selected by the UE.

Second: When the configuration information is an identity value TA-group-index of the TA group to which the first SCell belongs, the base station generates the first RA-RNTI by using a formula RA-RNTI=1+t_id+10*f_id+N*TA-group-index, according to the configured identity value TA-group-index of the TA group to which the first SCell belongs which is corresponding to the first SCell, and the information of the PRACH resource selected by the UE.

Third: When the configuration information is a specific offset value Offset_SCell corresponding to the first SCell, the base station generates the first RA-RNTI by using a formula RA-RNTI=1+t_id+10*f_id+Offset_SCell, according to the configured specific offset value Offset_SCell corresponding to the first SCell, which is corresponding to the first SCell, and the information of the PRACH resource selected by the UE.

Fourth: When the configuration information is a specific identity value SCell-index of a network corresponding to the first SCell, the base station generates the first RA-RNTI by using a formula RA-RNTI=1+t_id+10*f_id+N*SCell-index, according to the configured specific identity value SCell-index of a network corresponding to the first SCell, which is corresponding to the first SCell, and the information of the PRACH resource selected by the UE;

where t_id denotes a time domain number of the PRACH resource selected by the UE;

f_id denotes a frequency domain number of the PRACH resource selected by the UE; and 0≤TA-group-index<n, 0≤SCell-index<m, where n, m, and N are integers.

Further, the method according to this embodiment further includes:

generating, by the base station, a second RA-RNTI according to the information of the PRACH resource selected by the UE;

specifically, the second RA-RNTI may be obtained by using a formula RA-RNTI=1+t_id+10*f_id; and performing scrambling, by the base station, for the scheduling information of the random access response message by using the second RA-RNTI, and sending it to another UE by using the PDCCH of the first SCell.

In addition, the random access response message in each embodiment of the present disclosure may merely include a TA adjustment amount that the UE needs to adjust on the first SCell. That is to say, the random access response message may be replaced by a TA adjustment command message. The TA adjustment command message merely includes the TA adjustment amount.

Figure 9:
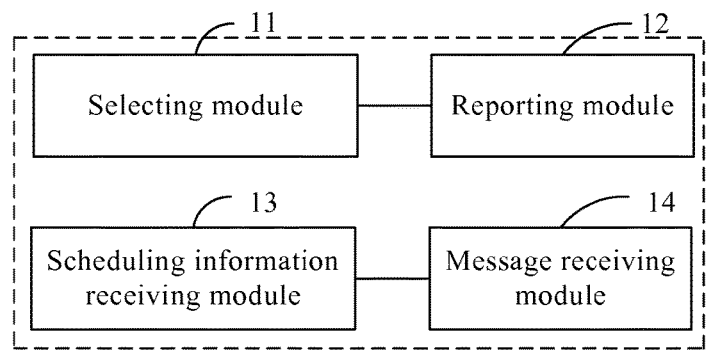
FIG. 9 is a schematic structural diagram of a UE according to an embodiment of the present disclosure.

FIG. 9 is a schematic structural diagram of a UE according to an embodiment of the present disclosure. As shown in FIG. 9, the UE according to this embodiment includes: a selecting module 11, a reporting module 12, a scheduling information receiving module 13 and a message receiving module 14. The selecting module 11 is configured to select a preamble on a first SCell. The reporting module 12 is configured to report information of the preamble to a base station by using a current PCell or a second SCell of the UE. The scheduling information receiving module 13 is configured to receive scheduling information of a random access response message or scheduling information of a conflict indication message from a PDCCH of the PCell, the second SCell or the first SCell by using a C-RNTI of the UE, where the random access response message and the conflict indication message are delivered by the base station. The message receiving module 14 is configured to receive the random access response message or the conflict indication message from a PDSCH according to the scheduling information of the random access response message or the scheduling information of the conflict indication message.

The UE in this embodiment may perform the technical solution of the method embodiment shown in FIG. 1, implementation principles thereof are similar, and details will not be described herein again.

In this embodiment, the UE selects a preamble on the first SCell, reports the information of the preamble to the base station by using the current PCell or the second SCell of the UE, receives the scheduling information of the random access response message or the scheduling information of the conflict indication message delivered by the base station from the PDCCH of the PCell, the second SCell or the first SCell by using the C-RNTI of the UE, and then receives the random access response message or the conflict indication message from the PDSCH according to the scheduling information of the random access response message or the scheduling information of the conflict indication message. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages or the scheduling information of the conflict indication messages of the SCells, thereby inevitably increasing times of blind detection and a false alarm probability.

Figure 10:
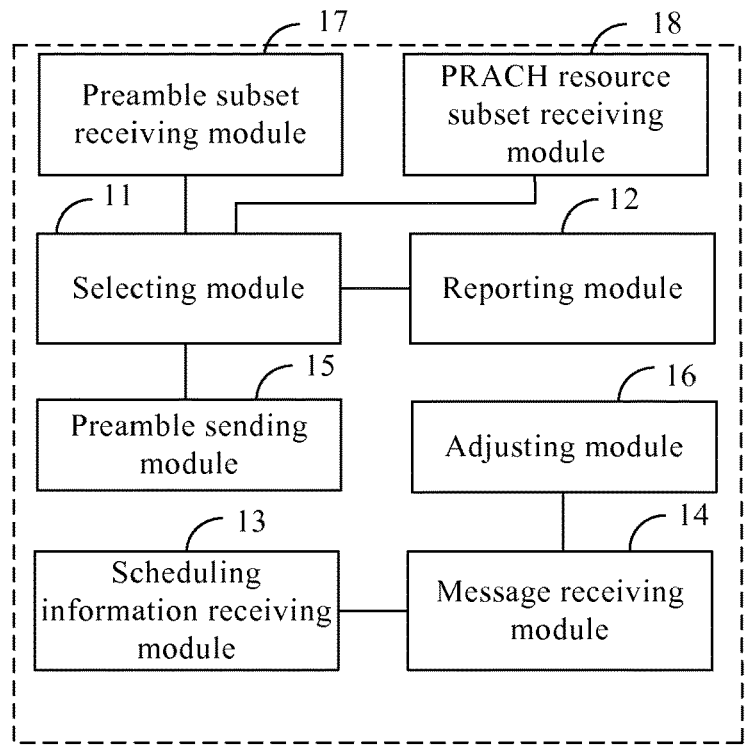
FIG. 10 is a schematic structural diagram of a UE according to another embodiment of the present disclosure.

FIG. 10 is a schematic structural diagram of a UE according to another embodiment of the present disclosure. Based on the embodiment shown in FIG. 9, and as shown in FIG. 10, when the scheduling information receiving module 13 is configured to receive the scheduling information of the random access response message delivered by the base station from the PDCCH of the PCell, the second SCell or the first SCell by using the C-RNTI of the UE, the selecting module 11 is further configured to select a PRACH resource on the first SCell, and the UE may also include: a preamble sending module 15 and an adjusting module 16. The preamble sending module 15 is configured to send a preamble to the base station by using the PRACH resource of the first SCell. The adjusting module 16 is configured to perform TA adjustment according to a TA value indicated in the random access response message.

Further, the UE may also include a preamble subset receiving module 17, configured to receive a preamble subset which is allowed to be used by the first SCell and notified by the base station, where the preamble subset is a part of preambles divided from a preamble set of the first SCell by the base station. The selecting module 11 is configured to select a PRACH resource on the first SCell, and select a preamble from the preamble subset.

Furthermore, the UE may also include a PRACH resource subset receiving module 18, configured to receive a PRACH resource subset which is allowed to be used by the UE on the first SCell and notified by the base station, where the PRACH resource subset is a part of PRACH resources divided from a PRACH resource set of the first SCell by the base station. The selecting module 11 is configured to select a PRACH resource from the PRACH resource subset on the first SCell, and select a preamble from the preamble subset.

Furthermore, the reporting module 12 is further configured to report a message of successfully obtaining the TA value to the base station.

The UE in this embodiment may perform the technical solution of the method embodiment shown in FIG. 2, implementation principles thereof are similar, and details will not be described herein again.

In this embodiment, the UE selects a preamble and a PRACH resource on the first SCell, reports the information of the preamble to the base station by using the current PCell or the second SCell of the UE, sends the preamble to the base station by using the PRACH resource of the first SCell, receives the scheduling information of the random access response message delivered by the base station from the PDCCH of the PCell, the second SCell or the first SCell by using the C-RNTI of the UE, receives the random access response message from the PDSCH according to the scheduling information of the random access response message, performs TA adjustment according to the TA value indicated in the random access response message, and finally reports the message of successfully obtaining the TA value to the base station. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Figure 11:
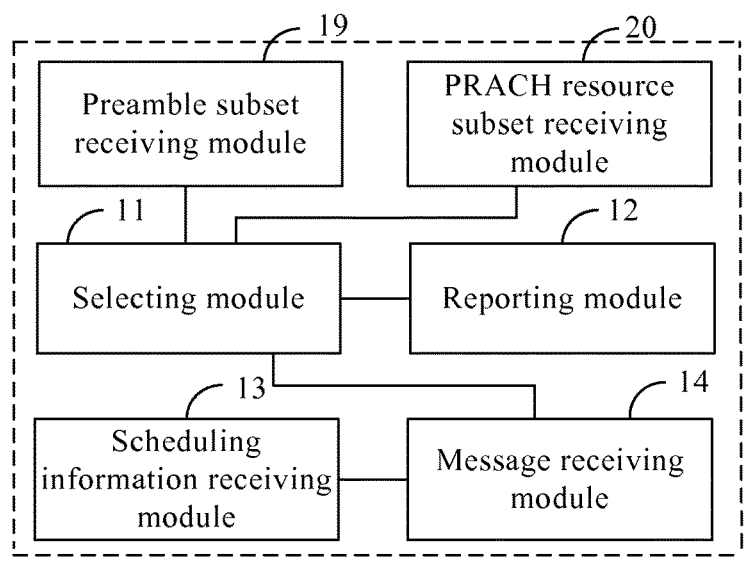
FIG. 11 is a schematic structural diagram of a UE according to yet another embodiment of the present disclosure.

FIG. 11 is a schematic structural diagram of a UE according to yet another embodiment of the present disclosure. Based on the embodiment shown in FIG. 9, as shown in FIG. 11, when the scheduling information receiving module 13 is configured to receive the scheduling information of the conflict indication message delivered by the base station from the physical downlink control channel of the PCell or the second SCell by using the C-RNTI of the UE, the selecting module 11 is further configured to re-select a preamble and/or a PRACH resource according to the conflict indication message.

Further, the selecting module 11 is further configured to select a PRACH resource on the first SCell, and the reporting module 12 is further configured to report information of the PRACH resource to the base station by using the PCell or the second SCell.

Further, the UE may also include a preamble subset receiving module 19, configured to receive a preamble subset which is allowed to be used by the first SCell and notified by the base station, where the preamble subset is a part of preambles divided from a preamble set of the first SCell by the base station. The selecting module 11 is configured to select a PRACH resource on the first SCell, and select a preamble from the preamble subset.

Furthermore, the UE may also include a PRACH resource subset receiving module 20, configured to receive a PRACH resource subset which is allowed to be used by the UE on the first SCell and notified by the base station, where the PRACH resource subset is a part of PRACH resources divided from a PRACH resource set of the first SCell by the base station. The selecting module 11 is configured to select a PRACH resource from the PRACH resource subset on the first SCell, and select a preamble from the preamble subset.

The UE in this embodiment may perform the technical solution of the method embodiment shown in FIG. 3, implementation principles thereof are similar, and details will not be described herein again.

In this embodiment, the UE selects a preamble and a PRACH resource on the first SCell, reports the information of the preamble by using the current PCell or the second SCell of the UE, receives the scheduling information of the conflict indication message delivered by the base station from the PDCCH of the PCell, the second SCell or the first SCell by using the C-RNTI of the UE, receives the conflict indication message from the PDSCH according to the scheduling information, and re-selects a preamble and/or a PRACH resource according to the conflict indication message. In this way, the defect in the prior art is addressed: when the UE performs a contention-based RACH on SCells, if all RACH procedures are implemented on the SCells, the UE needs to monitor the CSSs of the SCells to obtain the scheduling information of the conflict indication messages of the SCells, thereby inevitably increasing times of blind detection and a false alarm probability.

Figure 12:
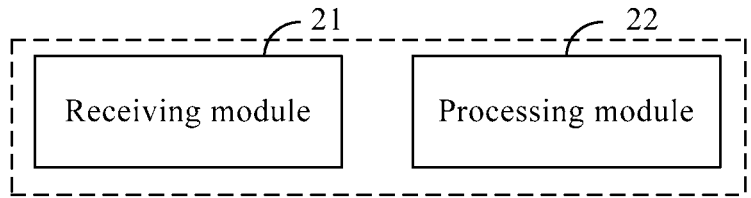
FIG. 12 is a schematic structural diagram of a base station according to an embodiment of the present disclosure.

FIG. 12 is a schematic structural diagram of a base station according to an embodiment of the present disclosure. As shown in FIG. 12, the base station according to this embodiment includes: a receiving module 21 and a processing module 22, where the receiving module 21 is configured to receive information of a preamble reported by a UE by using a current PCell or a second SCell of the UE; where the preamble is a preamble selected by the UE on a first SCell; and the processing module 22 is configured to perform scrambling for scheduling information of a random access response message or scheduling information of a conflict indication message on the PCell, the second SCell or the first SCell by using a radio network temporary identity corresponding to the UE, and send the scheduling information to the UE by using a PDCCH of the PCell, the second SCell or the first SCell, to enable the UE to receive the random access response message or the conflict indication message from the PDSCH according to the scheduling information.

The base station in this embodiment may perform the technical solution of the method embodiment shown in FIG. 4, implementation principles thereof are similar, and details will not be described herein again.

In this embodiment, the base station receives the information of the preamble reported by the UE by using the current PCell or the second SCell of the UE, performs scrambling for the scheduling information of the random access response message or the scheduling information of the conflict indication message on the PCell, the second SCell or the first SCell by using the radio network temporary identity corresponding to the UE, and sends it to the UE by using the PDCCH of the PCell, the second SCell or the first SCell, to enable the UE to receive the random access response message or the conflict indication message from the PDSCH according to the scheduling information. In this way, the defect in the prior art is addressed: when the UE performs contention-based RACH on SCells, if all RACH procedures are implemented on the SCells, the UE needs to monitor the CSSs of the SCells to obtain the scheduling information of the random access response messages or the scheduling information of the conflict indication messages of the SCells, thereby inevitably increasing times of blind detection and a false alarm probability.

Figure 13:
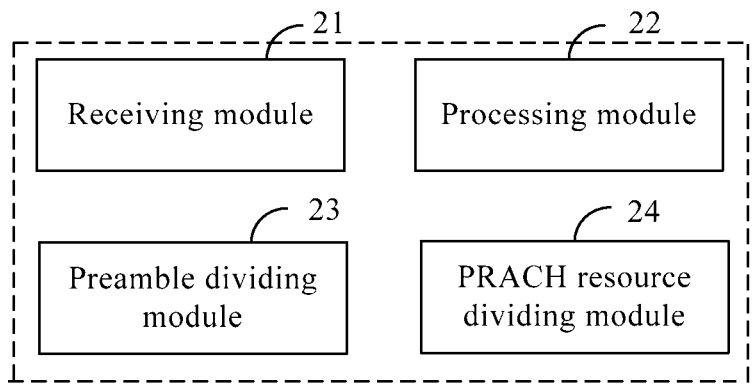
FIG. 13 is a schematic structural diagram of a base station according to another embodiment of the present disclosure.

FIG. 13 is a schematic structural diagram of a base station according to another embodiment of the present disclosure. Based on the embodiment shown in FIG. 12, as shown in FIG. 13, when the processing module 22 is configured to perform scrambling for scheduling information of random access response message on the PCell, the second SCell or the first SCell by using the radio network temporary identity corresponding to the UE, and send the scheduling information to the UE by using the PDCCH of the PCell, the second SCell or the first SCell, the receiving module 21 is further configured to receive the preamble which is sent by the UE by using the PRACH resource of the first SCell and is selected by the UE on the first SCell.

Further, the receiving module 21 is further configured to receive the information of the PRACH resource reported by the UE by using the current PCell or the second SCell of the UE; where the PRACH resource is a PRACH resource selected by the UE on the first SCell.

Furthermore, the processing module 22 may also be configured to perform scrambling for the scheduling information of the random access response message on the PCell, the second SCell or the first SCell by using the C-RNTI corresponding to the UE, and send the scheduling information to the UE by using the PDCCH of the PCell, the second SCell or the first SCell.

Alternatively, the processing module 22 may also be configured to perform scrambling for the scheduling information of the random access response message on the PCell, the second SCell or the first SCell by using the C-RNTI corresponding to the UE, and send the scheduling information to the UE by using the PDCCH of the PCell, the second SCell or the first SCell, and perform scrambling for the scheduling information of the random access response message on the first SCell by using an RA-RNTI corresponding to the PRACH resource used when the UE sends the preamble, and send it to another UE by using the PDCCH of the first SCell.

Furthermore, the UE may also include: a preamble dividing module 23, configured to divide a part of preambles from a preamble set of the first SCell as a preamble subset allowed to be used by the UE, and notify the UE of the preamble subset, to enable the UE to select a preamble from the preamble subset on the first SCell.

Furthermore, the UE may also include: a PRACH resource dividing module 24, configured to divide a part of PRACH resources from a PRACH resource set of the first SCell as a PRACH resource subset allowed to be used by the UE, and notify the UE of the PRACH resource subset, to enable the UE to select a PRACH resource from the PRACH resource subset on the first SCell.

The base station in this embodiment may perform the technical solution of the method embodiment shown in FIG. 5, implementation principles thereof are similar, and details will not be described herein again.

In this embodiment, the base station receives the information of the preamble and the information of the PRACH resource reported by the UE by using the current PCell or the second SCell of the UE, receives the preamble which is selected by the UE on the first SCell and is sent by the UE by using the PRACH resource of the first SCell, performs scrambling for the scheduling information of the random access response message on the PCell, the second SCell or the first SCell by using the C-RNTI corresponding to the UE, and sends it to the UE by using the PDCCH of the PCell, the second SCell or the first SCell, to enable the UE to receive the random access response message from the PDSCH according to the scheduling information. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Figure 14:
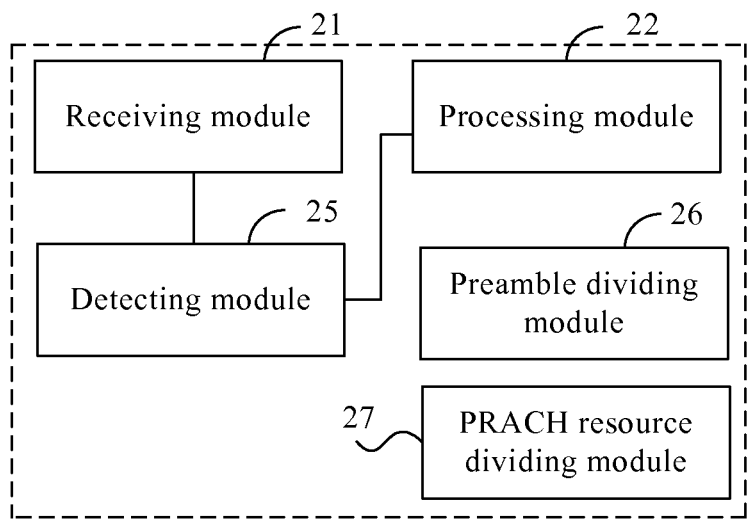
FIG. 14 is a schematic structural diagram of a base station according to yet another embodiment of the present disclosure.

FIG. 14 is a schematic structural diagram of a base station according to yet another embodiment of the present disclosure. Based on the embodiment shown in FIG. 12, as shown in FIG. 14, when the processing module 22 is configured to perform scrambling for the scheduling information of the conflict indication message on the PCell, the second SCell or the first SCell by using the radio network temporary identity corresponding to the UE, and send the scheduling information to the UE by using the PDCCH of the PCell, the second SCell or the first SCell, the base station further includes: a detecting module 25, configured to detect whether a conflict occurs between the information of the preamble selected by the UE on the first SCell and information of a preamble selected by another user equipment; and the processing module 22 is configured to perform scrambling for the scheduling information of the conflict indication message on the PCell, the second SCell or the first SCell by using the C-RNTI corresponding to the UE, and send the scheduling information to the UE by using the PDCCH of the PCell, the second SCell or the first SCell if the detecting module 25 detects that a conflict occurs at the information of the preamble selected by the UE on the first SCell.

Further, the receiving module 21 is further configured to receive the information of the PRACH resource reported by the UE by using the current PCell or the second SCell of the UE; where the PRACH resource is a PRACH resource selected by the UE on the first SCell.

Furthermore, the detecting module 25 is configured to detect whether conflicts occur between the information of the preamble selected by the UE on the first SCell and the information of the preamble selected by the another user equipment, and between the information of the PRACH resource selected by the UE on the first SCell, and information of a PRACH resource selected by the another user equipment.

Furthermore, the UE may also include: a preamble dividing module 26, configured to divide a part of preambles from a preamble set of the first SCell as a preamble subset allowed to be used by the UE, and notify the UE of the preamble subset, to enable the UE to select a preamble from the preamble subset on the first SCell.

Furthermore, the UE may also include: a PRACH resource dividing module 27, configured to divide a part of PRACH resources from a PRACH resource set of the first SCell as a PRACH resource subset allowed to be used by the UE, and notify the UE of the PRACH resource subset, to enable the UE to select a PRACH resource from the PRACH resource subset on the first SCell.

The base station in this embodiment may perform the technical solution of the method embodiment shown in FIG. 6, implementation principles thereof are similar, and details will not be described herein again.

In this embodiment, the base station receives the information of the preamble reported by the UE by using the current PCell or the second SCell of the UE, performs scrambling for the scheduling information of the conflict indication message on the PCell, the second SCell or the first SCell by using the C-RNTI corresponding to the UE, and sends it to the UE by using the PDCCH of the PCell, the second SCell or the first SCell, to enable the UE to receive the conflict indication message from the PDSCH according to the scheduling information. In this way, the defect in the prior art is addressed: when the UE performs a contention-based RACH on SCells, if all RACH procedures are implemented on the SCells, the UE needs to monitor the CSSs of the SCells to obtain the scheduling information of the conflict indication messages of the SCells, thereby inevitably increasing times of blind detection and a false alarm probability.

Figure 15:
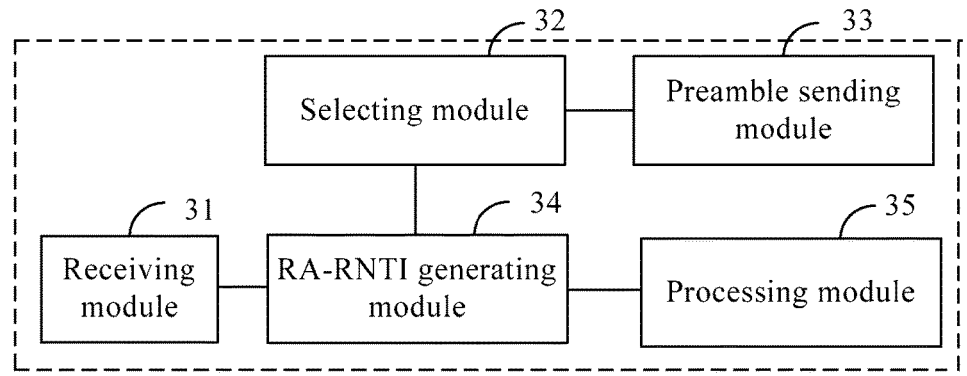
FIG. 15 is a schematic structural diagram of a UE according to an embodiment of the present disclosure.

FIG. 15 is a schematic structural diagram of a UE according to an embodiment of the present disclosure. As shown in FIG. 15, the UE according to this embodiment includes: a receiving module 31, a selecting module 32, a preamble sending module 33, an RA-RNTI generating module 34 and a processing module 35. The receiving module 31 is configured to receive configuration information corresponding to a first SCell sent by a base station. The selecting module 32 is configured to select a preamble and a PRACH resource on the first SCell. The preamble sending module 33 is configured to send the preamble to the base station by using the PRACH resource. The RA-RNTI generating module 34 is configured to generate an RA-RNTI according to information of the PRACH resource and the configuration information. The processing module 35 is configured to receive scheduling information of a random access response message from a PDCCH of the current PCell or the second SCell of the UE by using the generated RA-RNTI, and receive, from a PDSCH of the PCell, the second SCell or the first SCell according to the scheduling information, the random access response message sent by the base station.

The UE in this embodiment may perform the technical solution of the method embodiment shown in FIG. 7, implementation principles thereof are similar, and details will not be described herein again.

In this embodiment, the UE receives the configuration information corresponding to the first SCell sent by the base station, selects a preamble and a PRACH resource on the first SCell, sends the preamble to the base station by using the PRACH resource, generates the RA-RNTI according to the PRACH resource and the configuration information, and finally the UE receives the scheduling information of the random access response message from the PDCCH of the current PCell or the second SCell of the UE by using the generated RA-RNTI, and receives, from the PDSCH of the PCell, the second SCell or the first SCell according to the scheduling information, the random access response message sent by the base station. In this way, the defect in the prior art is addressed: when the UE performs a contention-based RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Further, the RA-RNTI generating module 34 is configured to: when the configuration information is a specific offset value Offset_TA-group corresponding to the TA group to which the first SCell belongs, generate an RA-RNTI by using a formula RA-RNTI=1+t_id+10*f_id+Offset_TA-group, according to the information of the PRACH resource and the received specific offset value Offset_TA-group corresponding to the TA group to which the first SCell belongs which is sent by the base station and corresponding to the first SCell.

Alternatively, the RA-RNTI generating module 32 is configured to: when the configuration information is an identity value TA-group-index of the TA group to which the first SCell belongs, generate an RA-RNTI by using a formula RA-RNTI=1+t_id+10*f_id+N*TA-group-index, according to the information of the PRACH resource and the received identity value TA-group-index of the TA group to which the first SCell belongs which is sent by the base station and corresponding to the first SCell.

Alternatively, the RA-RNTI generating module 32 is configured to: when the configuration information is a specific offset value Offset_SCell corresponding to the first SCell, generate an RA-RNTI by using a formula RA-RNTI=1+t_id+10*f_id+Offset_SCell, according to the information of the PRACH resource and the received specific offset value Offset_SCell corresponding to the first SCell, which is sent by the base station and corresponding to the first SCell.

Alternatively, the RA-RNTI generating module 32 is configured to: when the configuration information is a specific identity value SCell-index of a network corresponding to the first SCell, generate an RA-RNTI by using a formula RA-RNTI=1+t_id+10*f_id+N*SCell-index, according to the information of the PRACH resource and the received specific identity value SCell-index of a network corresponding to the first SCell, which is sent by the base station and corresponding to the first SCell;

where t_id denotes a time domain number of the PRACH resource selected by the UE;

f_id denotes a frequency domain number of the PRACH resource selected by the UE; and 0≤TA-group-index<n, 0≤SCell-index<m, where n, m, and N are integers.

Figure 16:
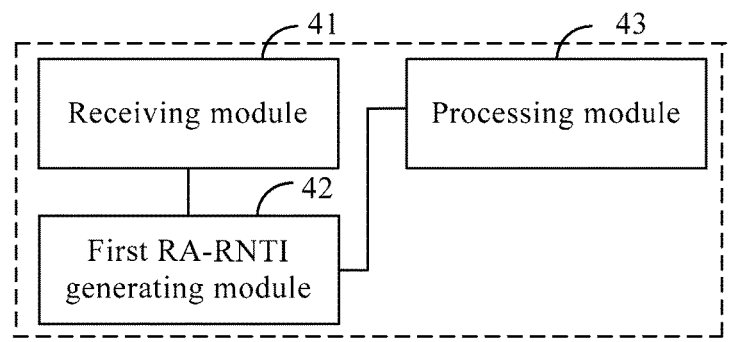
FIG. 16 is a schematic structural diagram of a base station according to an embodiment of the present disclosure.

FIG. 16 is a schematic structural diagram of a base station according to an embodiment of the present disclosure. As shown in FIG. 16, the base station according to this embodiment includes: a receiving module 41, a first RA-RNTI generating module 42 and a processing module 43. The receiving module 41 is configured to receive a preamble which is sent by a UE by using a PRACH resource, where the preamble is a preamble selected by the UE on a first SCell, and the PRACH resource is a PRACH resource selected on the first SCell. The first RA-RNTI generating module 42 is configured to generate a first RA-RNTI according to configured configuration information corresponding to the first SCell and information of the PRACH resource selected by the UE. The processing module 43 is configured to perform scrambling for scheduling information of a random access response message by using the first RA-RNTI, and send the scheduling information to the UE by using a PDCCH of the current PCell or the second SCell of the UE.

The UE in this embodiment may perform the technical solution of the method embodiment shown in FIG. 8, implementation principles thereof are similar, and details will not be described herein again.

In this embodiment, the base station receives the preamble which is sent by the UE by using the PRACH resource, where the preamble is a preamble selected by the UE on the first SCell, and the PRACH resource is a PRACH resource selected on the first SCell, generates the first RA-RNTI according to the configured configuration information corresponding to the first SCell and the information of the PRACH resource selected by the UE, performs scrambling for scheduling information of the random access response message by using the first RA-RNTI, and sends it to the UE by using the PDCCH of the current PCell or the second SCell of the UE. In this way, the defect in the prior art is addressed: when the UE performs an RACH on SCells, if all RACH procedures are implemented on the SCells, the UE needs to monitor the CSSs of the SCells to obtain the scheduling information of the random access response messages of the SCells, thereby inevitably increasing times of blind detection and a false alarm probability.

Further, in another embodiment of the present disclosure, based on the embodiment shown in FIG. 16, the base station may further include: a configuring module, configured to configure configuration information corresponding to the first SCell, and send the configuration information to the UE.

Furthermore, the first RA-RNTI generating module 42 may have the following four implementation manners, which are as follows:

First: The first RA-RNTI generating module 42 is configured to: when the configuration information is a specific offset value Offset_TA-group corresponding to the TA group to which the first SCell belongs, generate the RA-RNTI by using a formula RA-RNTI=1+t_id+10*f_id+Offset_TA-group, according to the configured specific offset value Offset_TA-group corresponding to the TA group to which the first SCell belongs which is corresponding to the first Scell, and the information of the PRACH resource selected by the UE; or Second: The first RA-RNTI generating module 42 is configured to: when the configuration information is an identity value TA-group-index of the TA group to which the first SCell belongs, generate the RA-RNTI by using a formula RA-RNTI=1+t_id+10*f_id+N*TA-group-index, according to the configured identity value TA-group-index of the TA group to which the first SCell belongs which is corresponding to the first SCell, and the information of the PRACH resource selected by the UE; or Third: The first RA-RNTI generating module 42 is configured to: when the configuration information is a specific offset value Offset_SCell corresponding to the first SCell, generate the RA-RNTI by using a formula RA-RNTI=1+t_id+10*f_id+Offset_SCell, according to the configured specific offset value Offset_SCell corresponding to the first SCell which is corresponding to the first SCell, and the information of the PRACH resource selected by the UE; or Fourth: The first RA-RNTI generating module 42 is configured to: when the configuration information is a specific identity value of a network corresponding to the first SCell, SCell-index, generate an RA-RNTI by using a formula RA-RNTI=1+t_id+10*f_id+N*SCell-index, according to the configured specific identity value Cell-index of a network corresponding to the first SCellS which is corresponding to the first SCell, and the information of the PRACH resource selected by the UE;

where t_id denotes a time domain number of the PRACH resource selected by the UE;

f_id denotes a frequency domain number of the PRACH resource selected by the UE; and 0≤TA-group-index<n, 0≤SCell-index<m, where n, m, and N are integers.

Furthermore, the base station may further include: a second RA-RNTI generating module 44, configured to generate a second RA-RNTI according to the information of the PRACH resource selected by the UE; and the processing module 43 is further configured to perform scrambling for scheduling information of the random access response message by using the second RA-RNTI, and send it to another UE by using the PDCCH of the first SCell.

Figure 17:
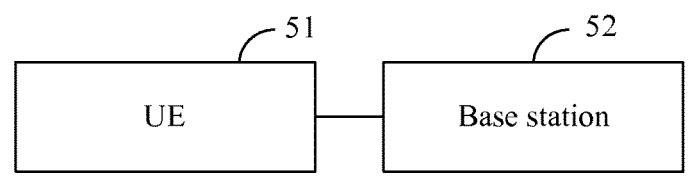
FIG. 17 is a schematic structural diagram of a processing system for obtaining synchronization according to an embodiment of the present disclosure.

FIG. 17 is a schematic structural diagram of a processing system for obtaining synchronization according to an embodiment of the present disclosure. As shown in FIG. 17, the system according to this embodiment includes: a UE 51 and a base station 52.

Specifically, the UE 51 may be the UE shown in any one of FIG. 9-FIG. 11, and the base station 52 may be the base station shown in any one of FIG. 12-FIG. 14.

Alternatively, the UE 51 may be the UE shown in FIG. 15, and the base station 52 may be the base station shown in FIG. 16.

A person of ordinary skill in the art may understand that all or portion of the steps of the methods in the embodiments may be implemented by a program instructing relevant hardware. The program may be stored in a computer readable storage medium. When the program is executed, the steps of the methods in the embodiments are performed. The storage medium includes any medium that is capable of storing program codes, such as a ROM (read-only memory), a RAM (random-access memory), a magnetic disk, or an optical disk.

The device embodiments described above are merely exemplary, and the units described as separate parts may be or may not be physically separate, and parts displayed as units may be or may not be physical units, that is, may be located in one position, or may be distributed on at least two network units. A part or all of the modules may be selected according to actual needs to achieve the objectives of the solutions of the embodiments. A person of ordinary skill in the art may understand and implement the embodiments without creative efforts.

The foregoing embodiments are merely intended for describing the technical solutions of the present disclosure rather than limiting the present disclosure. Although the present disclosure is described in detail with reference to the foregoing embodiments, a person of ordinary skill in the art should understand that they may still make modifications to the technical solution described in the foregoing embodiments or make equivalent substitutions to some technical features thereof, without departing from the spirit and scope of the technical solution of the embodiments of the present disclosure.

What is claimed is:

1. A processing method for obtaining synchronization comprising:
   receiving, by a user equipment, configuration information corresponding to a first secondary cell from a base station;
   receiving, by the user equipment, a preamble subset which is allowed to be used by the user equipment on the first secondary cell and notified by the base station, wherein the preamble subset is a part of preambles divided from a preamble set of the first secondary cell by the base station;
   selecting, by the user equipment, a preamble from the preamble subset and a physical random access channel resource on the first secondary cell;
   sending, by the user equipment, the preamble to the base station by using the physical random access channel resource selected by the UE on the first secondary cell;
   generating, by the user equipment, a random access-radio network temporary identity according to information of the physical random access channel resource selected by the UE on the first secondary cell and the configuration information corresponding to the first secondary cell, wherein the random access-radio network temporary identity generated by the user equipment is equal to a first random access-radio network temporary identity, generated by the base station, according to the configuration information corresponding to the first secondary cell and information of the physical random access channel resource selected by the user equipment; and
   receiving, by the user equipment, scheduling information of a random access response message from a physical downlink control channel of a second secondary cell of the user equipment by using the generated random access-radio network temporary identity, and receiving, from a physical downlink shared channel of the second secondary cell according to the scheduling information, the random access response message from the base station.

2. The processing method for obtaining synchronization according to claim 1, wherein the configuration information comprises:
  a specific offset value corresponding to the timing advance group to which the first secondary cell belongs.

3. The processing method for obtaining synchronization according to claim 2, wherein the generating, by the user equipment, the random access-radio network temporary identity according to information of the physical random access channel resource and the configuration information comprises:
  when the configuration information is a specific offset value Offset_TA-group corresponding to the timing advance group to which the first secondary cell belongs, generating, by the user equipment, the random access-radio network temporary identity (RA-RNTI) by using a formula RA-RNTI=1+t_id+10*f_id+Offset_TA-group, according to the information of the physical random access channel resource and the Offset_TA-group.

4. A processing method for obtaining synchronization, the method comprising:
  receiving, by a base station, a preamble that is from a user equipment by using a physical random access channel resource, wherein the preamble is a preamble selected by the user equipment on a first secondary cell, and the physical random access channel resource is a physical random access channel resource selected by the user equipment on the first secondary cell;
  generating, by the base station, a first random access-radio network temporary identity according to configuration information corresponding to the first secondary cell and information of the physical random access channel resource selected by the user equipment;
  performing scrambling, by the base station, for scheduling information of a random access response message by using the first random access-radio network temporary identity, and sending the scheduling information to the user equipment by using a physical downlink control channel of a second secondary cell of the user equipment;
  generating, by the base station, a second random access-radio network temporary identity according to the information of the physical random access channel resource selected by the user equipment; and
  performing scrambling, by the base station, for the scheduling information of the random access response message by using the second random access-radio network temporary identity, and sending the scheduling information to another user equipment by using the physical downlink control channel of the first secondary cell.

5. The processing method for obtaining synchronization according to claim 4, further comprising:
  sending, by the base station, the configuration information to the user equipment.

6. The processing method for obtaining synchronization according to claim 4, wherein the configuration information comprises:
  a specific offset value corresponding to the timing advance group to which the first secondary cell belongs.

7. The processing method for obtaining synchronization according to claim 6, wherein the generating, by the base station, the first random access-radio network temporary identity according to the configuration information corresponding to the first secondary cell and information of the physical random access channel resource selected by the user equipment comprises:
  when the configuration information is a specific offset value Offset_TA-group corresponding to the timing advance group to which the first secondary cell belongs, generating, by the base station, the first random access-radio network temporary identity (RA-RNTI) by using a formula RA-RNTI=1+t_id+10*f_id+Offset_TA-group, according to the Offset_TA-group and the information of the physical random access channel resource selected by the user equipment;
  wherein t_id denotes a time domain number of the physical random access channel resource selected by the user equipment; f_id denotes a frequency domain number of the physical random access channel resource selected by the user equipment; and 0≤TA-group-index<n, wherein n is an integer.

8. A user equipment comprising:
  a radio interface configured to receive configuration information corresponding to a first secondary cell from a base station, including receiving a preamble subset that is allowed to be used by the user equipment on the first secondary cell and notified by the base station, wherein the preamble subset is a part of preambles divided from a preamble set of the first secondary cell by the base station;
  a processor coupled with the radio interface and configured to select a preamble from the preamble subset and a physical random access channel resource on the first secondary cell;
  the radio interface configured to send the preamble to the base station by using the physical random access channel resource selected by the UE on the first secondary cell; and
  the processor configured to (a) generate a random access-radio network temporary identity according to information of the physical random access channel resource selected by the UE on the first secondary cell and the configuration information corresponding to the first secondary cell, wherein the random access-radio network temporary identity generated by the user equipment is equal to a first random access-radio network temporary identity, generated by the base station, according to the configuration information corresponding to the first secondary cell and information of the physical random access channel resource selected by the user equipment (b) receive scheduling information of a random access response message from a physical downlink control channel of a second secondary cell of the user equipment by using the generated random access-radio network temporary identity, and (c) receive, from the physical downlink shared channel of the second secondary cell according to the scheduling information, the random access response message from the base station.

9. The user equipment according to claim 8, wherein the processor is further configured to:
  when the configuration information is a specific offset value Offset_TA-group corresponding to the timing advance group to which the first secondary cell belongs, generate a random access-radio network temporary identity (RA-RNTI) by using a formula RA-RNTI=1+t_id+10*f_id+Offset_TA-group, according to the information of the physical random access channel resource and the Offset_TA-group;

wherein t_id denotes a time domain number of the physical random access channel resource selected by the user equipment; f_id denotes a frequency domain number of the physical random access channel resource selected by the user equipment; and 0≤TA-group-index<n, wherein n is an integer.

10. A base station comprising:

a radio interface configured to receive a preamble that is from a user equipment by using a physical random access channel resource, wherein the preamble is a preamble selected by the user equipment on a first secondary cell, and the physical random access channel resource is a physical random access channel resource selected by the user equipment on the first secondary cell;

a processor, coupled with the radio interface, configured to
- (a) generate a first random access-radio network temporary identity according to configuration information corresponding to the first secondary cell and information of the physical random access channel resource selected by the user equipment;
- (b) perform scrambling for the scheduling information of a random access response message by using the first random access-radio network temporary identity, and perform transmission to the user equipment by using a physical downlink control channel of a second secondary cell of the user equipment;
- (c) generate a second random access-radio network temporary identity according to the information of the physical random access channel resource selected by the user equipment;
- (d) perform scrambling for the scheduling information of the random access response message by using the second random access-radio network temporary identity, and
- (e) send the scheduling information to another user equipment by using a physical downlink control channel of the first secondary cell.

11. The base station according to claim 10, wherein the processor is further configured to configure the configuration information corresponding to the first secondary cell, and send the configuration information to the user equipment.

12. The base station according to claim 11, wherein the processor is further configured to:

when the configuration information is a specific offset value Offset_TA-group corresponding to a timing advance group to which the first secondary cell belongs, generate a first random access-radio network temporary identity (RA-RNTI) by using a formula RA-RNTI=1+t_id+10*f_id+Offset_TA-group, according to the Offset_TA-group and the information of the physical random access channel resource selected by the user equipment;

wherein t_id denotes a time domain number of the physical random access channel resource selected by the user equipment; f_id denotes a frequency domain number of the physical random access channel resource selected by the user equipment; and 0≤TA-group-index<n, wherein n is an integer.

13. A chipset used in a mobile terminal for obtaining synchronization, the chipset comprising:

a communication interface configured to receive configuration information corresponding to a first secondary cell from a base station, including receiving a preamble subset that is allowed to be used by a user equipment on the first secondary cell and notified by the base station, wherein the preamble subset is a part of preambles divided from a preamble set of the first secondary cell by the base station;

a processor coupled with the communication interface and configured to select a preamble from the preamble subset and a physical random access channel resource on the first secondary cell;

the communication interface configured to send the preamble to the base station by using the physical random access channel resource; and the processor configured to (a) generate a random access-radio network temporary identity according to information of the physical random access channel resource and the configuration information, wherein the random access-radio network temporary identity generated by the user equipment is equal to a first random access-radio network temporary identity, generated by the base station, according to the configuration information corresponding to the first secondary cell and information of the physical random access channel resource selected by the user equipment (b) receive scheduling information of a random access response message from a physical downlink control channel of a second secondary cell of the user equipment by using the generated random access-radio network temporary identity, and (c) receive, from the physical downlink shared channel of the second secondary cell according to the scheduling information, the random access response message from the base station.

* * * * *